(12) United States Patent
Fersch et al.

(10) Patent No.: US 10,953,327 B2
(45) Date of Patent: Mar. 23, 2021

(54) METHODS, APPARATUS AND SYSTEMS FOR OPTIMIZING COMMUNICATION BETWEEN SENDER(S) AND RECEIVER(S) IN COMPUTER-MEDIATED REALITY APPLICATIONS

(71) Applicants: DOLBY INTERNATIONAL AB, Amsterdam Zuidoost (NL); DOLBY LABORATORIES LICENSING CORPORATION, San Francisco, CA (US)

(72) Inventors: Christof Fersch, Neumarkt (DE); Nicolas R. Tsingos, San Francisco, CA (US)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 16/485,928

(22) PCT Filed: Jun. 15, 2018

(86) PCT No.: PCT/US2018/037887
§ 371 (c)(1),
(2) Date: Aug. 14, 2019

(87) PCT Pub. No.: WO2018/232327
PCT Pub. Date: Dec. 20, 2018

(65) Prior Publication Data
US 2020/0094141 A1 Mar. 26, 2020

Related U.S. Application Data

(60) Provisional application No. 62/519,952, filed on Jun. 15, 2017, provisional application No. 62/680,678, filed on Jun. 5, 2018.

(30) Foreign Application Priority Data

Jun. 15, 2017 (EP) .................................... 17176248

(51) Int. Cl.
*A63F 13/00* (2014.01)
*A63F 13/428* (2014.01)
(Continued)

(52) U.S. Cl.
CPC .......... *A63F 13/428* (2014.09); *A63F 13/213* (2014.09); *G06F 3/012* (2013.01);
(Continued)

(58) Field of Classification Search
None
See application file for complete search history.

(56) References Cited

U.S. PATENT DOCUMENTS

| 6,259,795 B1* | 7/2001 | McGrath | H04S 7/304 381/310 |
| 2004/0098462 A1* | 5/2004 | Horvitz | H04L 67/26 709/207 |

(Continued)

FOREIGN PATENT DOCUMENTS

| WO | 200155833 W | 8/2001 |
| WO | 2013064914 A1 | 5/2013 |

OTHER PUBLICATIONS

Chan, K. et al "Distributed Sound Rendering for Interactive Virtual Environments" IEEE International Conference on Multimedia and Expo ,Jun. 27-30, 2004, pp. 1-4.

(Continued)

*Primary Examiner* — Paul A D'Agostino

(57) ABSTRACT

The present invention is directed to systems, methods and apparatus for processing media content for reproduction by a first apparatus. The method includes obtaining pose information indicative of a position and/or orientation of a user.

(Continued)

The pose information is transmitted to a second apparatus that provides the media content. The media content is rendered based on the pose information to obtain rendered media content. The rendered media content is transmitted to the first apparatus for reproduction. The present invention may include a first apparatus for reproducing media content and a second apparatus storing the media content. The first apparatus is configured to obtain pose information indicative and transmit the pose information to the second apparatus; and the second apparatus is adapted to: render the media content based on the pose information to obtain rendered media content; and transmit the rendered media content to the first apparatus for reproduction.

21 Claims, 7 Drawing Sheets

(51) Int. Cl.
  *A63F 13/213*      (2014.01)
  *G06F 3/01*        (2006.01)
  *H04L 29/06*       (2006.01)
  *H04S 3/00*        (2006.01)
  *H04S 7/00*        (2006.01)
(52) U.S. Cl.
  CPC .............. *H04L 67/38* (2013.01); *H04S 3/008* (2013.01); *H04S 7/303* (2013.01); *H04S 2400/01* (2013.01); *H04S 2400/11* (2013.01); *H04S 2420/11* (2013.01)

(56) References Cited

U.S. PATENT DOCUMENTS

| | | | |
|---|---|---|---|
| 2008/0144794 | A1 | 6/2008 | Gardner |
| 2011/0210982 | A1* | 9/2011 | Sylvan ................. G06T 15/005 345/629 |
| 2015/0109415 | A1* | 4/2015 | Son ....................... G01B 11/22 348/46 |
| 2015/0350846 | A1* | 12/2015 | Chen .................... G01C 21/206 455/456.1 |
| 2016/0361658 | A1* | 12/2016 | Osman .................. A63F 13/355 |
| 2017/0018121 | A1* | 1/2017 | Lawson ................. G06T 17/00 |
| 2017/0295446 | A1 | 10/2017 | Thagadur Shivappa |

OTHER PUBLICATIONS

Mariette, N. et al "SoundDelta" A Study of Audio Augmented Reality using WIFI-distributed Ambisonic Cell Rendering AES, presented at the 128th Convention, May 22-25, 2010, London, UK, pp. 1-15.

Warusfel, O. et al "Listen Augmenting Everyday Environments Through Interactive Soundscapes" Cordis EU Research, start date Jan. 1, 2001.

* cited by examiner

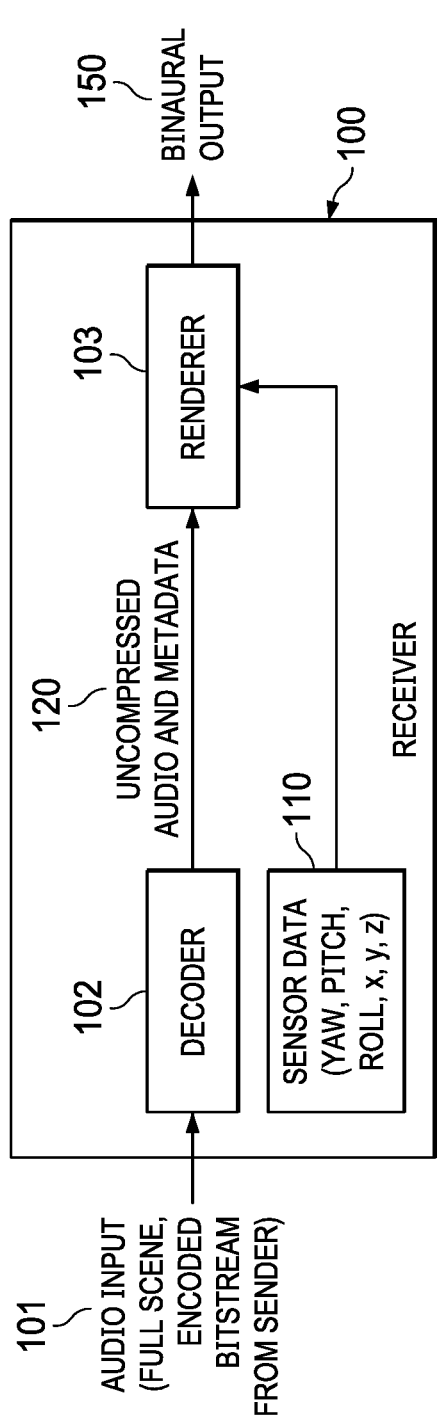
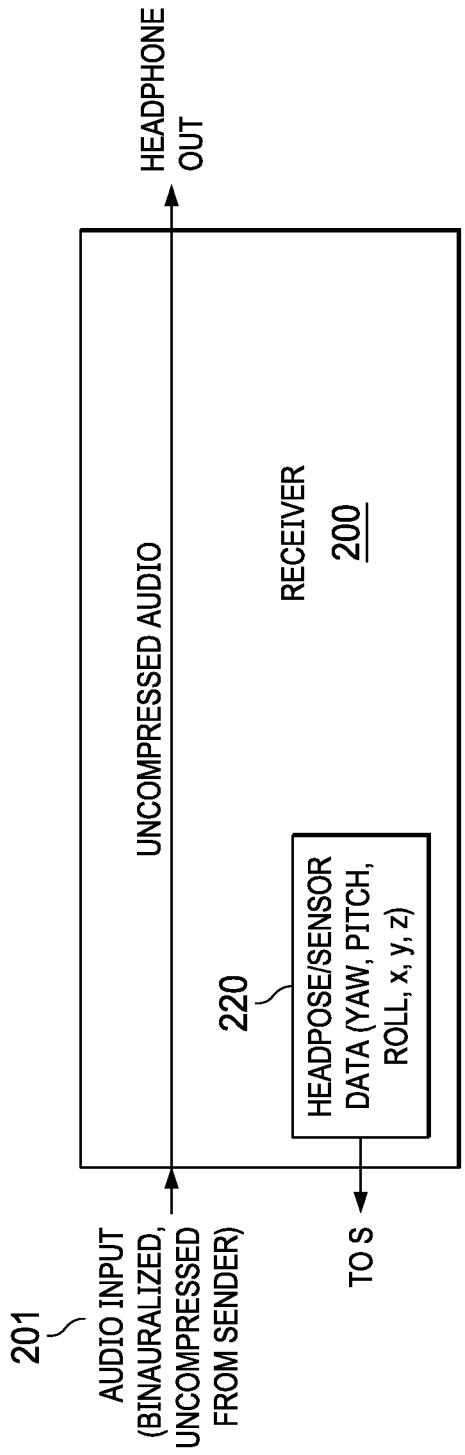
FIG. 1
FIG. 2

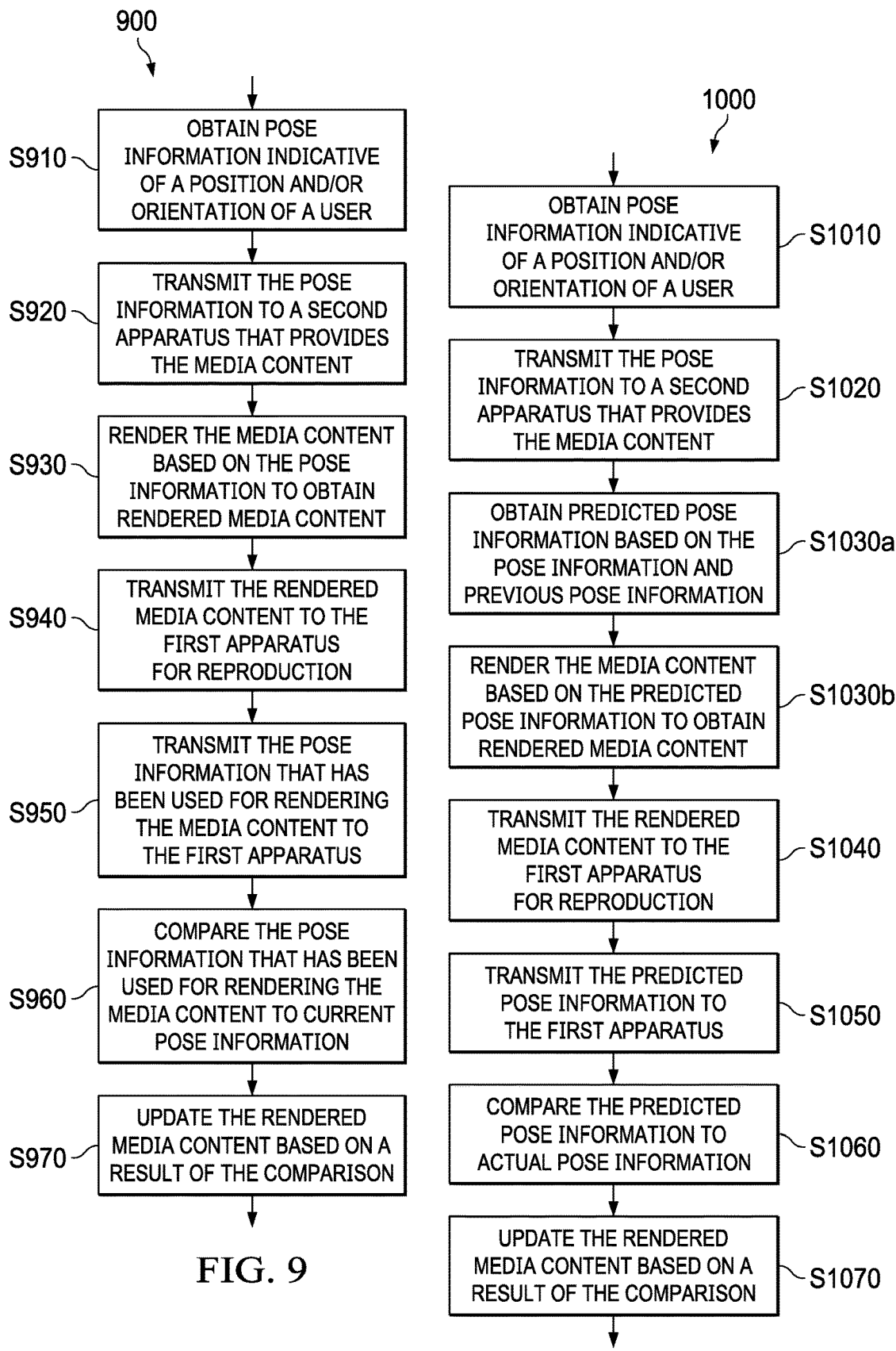

METHODS, APPARATUS AND SYSTEMS FOR OPTIMIZING COMMUNICATION BETWEEN SENDER(S) AND RECEIVER(S) IN COMPUTER-MEDIATED REALITY APPLICATIONS

CROSS REFERENCE TO RELATED APPLICATIONS

This application claims priority to U.S. Provisional Application No. 62/680,678, filed on Jun. 5, 2018; U.S. Provisional Application No. 62/519,952 and European Patent Application No. 17176248.7, both filed on Jun. 15, 2017; all of which are incorporated by references in their entirety.

TECHNICAL FIELD

The present disclosure relates to computer-mediated reality applications, such as Virtual Reality (VR), Augmented Reality (AR), and Mixed Reality (MR) applications, for example. These applications may include but are not limited to client/receiver binauralized and non-binauralized audio and video applications.

BACKGROUND

Applications and products in the computer-mediated reality space (e.g., VR, AR and MR space) are rapidly evolving to include increasingly refined acoustical models of sound sources and scenes. Without intended limitation, reference will be made to VR, AR, and MR in the remainder of this document. To optimize the computer-mediated reality experiences, it is preferable to minimize the delay between user movement (e.g., head movement) and perception of the sound adapted to this movement (rendered sound). This delay is also known as motion-to-sound latency or motion-to-ear lag. In addition, it is also desirable to minimize the number of instructions needed to decode and render sound for common receiver devices, such as smartphones, where it is important to optimize computational complexity and power consumption. When a whole audio scene is transmitted, for example for non-communication cases, the focus is on the receiver's rendering latency. For example, linear applications (e.g., movies), do not react dynamically to a user's actions. However, for interactive content, all cumulated roundtrip latencies would have to be accounted for (e.g. if the user triggers an event that needs to be sent back to the server for rendering). Before the content is consumed, the dynamically changed content should be encoded with sufficient lead time to so that the user does not recognize latency between motion and its resulting effect and that there is no misalignment between the audio and video of the content. Encoding and decoding latency is not considered for the motion-to-sound latency in the case of linear applications, as user-movements (position and/or orientation) do not influence the content itself. Rather, these movements only affect the perspective from which the content is viewed. Hence, for linear content, user-movement only affects rendering, but not encoding and/or decoding of output sound. Communication cases differ because a system can only start encoding, transmitting, and decoding media as the content (e.g. speech) occurs. The same applies for cases where interactive content (e.g., from a game engine) is real-time rendered and encoded by a remote server in the cloud. In addition, it is very important that the overall latency of the video and audio-systems are the same, as differences can cause motion-sickness. Therefore, depending on the latency of the video system, there is a need to achieve a similar level of audio-system latency.

SUMMARY

The present document addresses the technical problem of common AR, VR and MR systems having too high latency and too high computational complexity demands to deliver a compelling experience. To address this problem, the present document proposes a method of processing media content, a system for processing media content and corresponding apparatus, having the feature of the respective independent claims.

An aspect of the disclosure relates to a method of processing media content for reproduction by a first apparatus. The first apparatus may be one of a receiver, receiver apparatus, or replay apparatus, for example. Said first apparatus may correspond to, include, or operate in conjunction with AR/VR/MR equipment, such as an AR/VR/MR headset, for example. As such, the first apparatus may include reproduction equipment (e.g., speakers, headphones) for reproducing the media content and a processor that is coupled to the reproduction equipment. The media content may be or include audio content and/or video content. Processing may involve or correspond to rendering. Reproduction may involve or correspond to replay. The method may include obtaining pose information indicative of a position and/or orientation of a user. Obtaining the pose information may be performed at the first apparatus. The user may be a user of the first apparatus. The pose information may relate to a head of the user, for example. Said pose information may be obtained by a sensor, e.g., a pose sensor, that may be arranged in registration with the user. Hence, the pose information may be referred to as sensor data. The pose information may further include one or more first derivatives of the pose and/or one or more second derivatives of the pose. The user may wear the AR/VR/MR equipment, for example. The method may further include transmitting the pose information to a second apparatus that provides (e.g., stores, relays) the media content. The second apparatus may be one of a sender apparatus, server apparatus, or content delivery apparatus, for example. The second apparatus may be an apparatus for providing the media content to the first apparatus. The first and second apparatus may be spatially separated from each other. The method may further include rendering the media content based on the pose information to obtain rendered media content. The rendering may be performed at the second apparatus. The rendered media content may be referred to as pre-rendered media content. The rendering may be to two or more channels in the case of audio content, for example. The method may further include transmitting the rendered media content to the first apparatus for reproduction. Transmitting the rendered media content may be performed by the second apparatus. The method may yet further include reproducing (e.g., replaying) the rendered media content (by the first apparatus).

If only rendered media content needs to be transmitter, the transmission bitrate for lossless data transmission may be similar or comparable to the bitrate of a compressed version of the complete media content. Accordingly, compression may not be necessary in the context of the proposed method. Transmitting an uncompressed or lossless media stream would eliminate or reduce latency for encoding and decoding. For example, the latency resulting from encoding/decoding may be reduced to zero, which will result in an overall reduction of motion-to-ear latency and/or motion-to-eye latency. Moreover, when there is no compression of pre-rendered media content the first apparatus (receiver) can output audio/video without decoding or rendering. This will result in a reduction of computational complexity at the receiver because no decoding needs to be performed and/or rendering has already been completed at the sender side. Thus, the proposed method allows to reduce motion-to-ear latency and/or motion-to-eye latency, and further allows to reduce computational complexity at the receiver side.

In some embodiments, the media content may include audio content and the rendered media content may include rendered audio content. Alternatively, or additionally, the media content may include video content and the rendered media content may include rendered video content.

In some embodiments, the media content may include audio content and the rendered media content may include rendered audio content. Then, the method may further include generating an audible (e.g., acoustic) representation of the rendered audio content. Generating the audible representation may be performed at the first apparatus. Said generating may be performed via two or more loudspeakers of the first apparatus in the case of audio content, for example.

In some embodiments, the audio content may be one of First Order Ambisonics (FOA)-based, Higher Order Ambisonics (HOA)-based, object-based, or channel based audio content, or a combination of two or more of FOA-based, HOA-based, object-based, or channel based audio content.

In some embodiments, the rendered audio content may be one of binaural audio content, FOA audio content, HOA audio content, or channel-based audio content, or a combination of two or more of binaural audio content, FOA audio content, HOA audio content, or channel-based audio content.

In some embodiments, the rendering may involve obtaining predicted pose information based on the pose information and further based on previous pose information and/or the one or more first and/or second derivatives. The predicted pose information may be pose information for a future timing. The previous pose information may be pose information that has been obtained at, or received from, the first apparatus at a previous timing. The prediction may be performed at the second apparatus. Alternatively, the prediction may be performed at the first apparatus. In the latter case, the first apparatus may transmit the predicted pose information to the second apparatus. The rendering may further involve rendering the media content based on the predicted pose information to obtain the rendered media content.

By considering predicted pose information, a delay that may result from encoding/decoding of the rendered media content and/or transmission of the rendered media content to the first apparatus can be accounted for. In other words, said delay can be hidden for appropriately predicted pose information so that the user will not become aware of this delay and may not perceive any mismatch between audio, video, and movement.

In some embodiments, the method may further include transmitting the predicted pose information to the first apparatus together with the rendered media content.

This enables the first apparatus to perform a check of whether the predicted pose information (i.e., pose information that has been used for rendering the media content in this case) is the same (or substantially the same) as actual/current pose information (i.e., pose information currently obtained at the first apparatus), and to appropriately adapt the rendered media content if there is a mismatch between the predicted pose information and the actual/current pose information.

In some embodiments, the method may further include comparing the predicted pose information to actual pose information. The method may yet further include updating the rendered media content based on a result of the comparison. Said comparing and said updating may be performed at the first apparatus. The actual pose information may be pose information at the timing (e.g., obtained at the timing) at which the rendered media content is reproduced by the first apparatus, for example. The updating may be performed based on a difference between the predicted pose information and the actual pose information, for example. Said updating may involve extrapolation of the rendered media content, for example by rotation, level changes and/or blind upmixing.

In some embodiments, the predicted pose information may be predicted for an estimate of a timing at which the rendered media content is expected to be processed by the first apparatus for reproduction. Processing of the rendered media content by the first apparatus may involve reproducing (e.g., replaying) the rendered media content. The actual pose information (e.g., current pose information) may be pose information obtained at a timing at which the rendered media content is actually processed by the first apparatus for reproduction. The actual pose information may be obtained at the timing at which the rendered media content is actually processed by the first apparatus.

Thereby, any mismatch between the predicted pose information and the actual pose information can be accounted for to thereby better adapt the rendered media content to the user's pose (e.g., pose of the user's head) and avoid any discrepancy between perceived and expected audio/video scene for the user. Since the mismatch between the predicted pose information and the actual pose information is expected to be small, such adaptation can be safely entrusted to the first apparatus, at manageable computational complexity.

In some embodiments, the rendered media content may be transmitted to the first apparatus in uncompressed form.

This enables to reduce computational complexity at first apparatus (receiver), and moreover reduces a round trip delay between a change of pose and reproduction of media content that has been rendered in accordance with the changed pose.

In some embodiments, the method may further include encoding (e.g., compressing) the rendered media content before transmission to the first apparatus. The method may yet further include decoding (e.g., decompressing) the encoded rendered media content after reception at the first apparatus. Encoding/decoding may involve or correspond to compressing/decompressing the rendered media content. The encoding/decoding may be low delay encoding/decoding.

In some embodiments, the estimate of the timing at which the rendered audio content is expected to be processed by the first apparatus for reproduction may include an estimation of a time that is necessary for encoding and decoding the rendered audio content and/or an estimate of a time that is necessary for transmitting the rendered media content to the first apparatus.

In some embodiments, the predicted pose information may be obtained further based on an estimate of a time that is necessary for encoding and decoding the rendered media content and/or an estimate of a time that is necessary for transmitting the rendered media content to the first apparatus.

Thereby, delays resulting from encoding/decoding and/or transmission can be hidden in the sense that the user becomes not aware of these delays.

In some embodiments, the method may further include comparing the pose information that has been used for rendering the media content to current pose information. The current pose information may be pose information that is obtained at the time of reproducing the rendered media content, for example. The method may yet further include updating the rendered media content based on a result of the comparison. The updating may be performed based on a difference between the pose information that has been used for rendering the media content and the current pose information. Said updating may involve extrapolation of the rendered media content, for example by rotation, level changes and/or blind upmixing.

In some embodiments, the method may further include determining, at the second apparatus, gradient information indicative of how the rendered media content changes in response to changes of the pose information (e.g., changes of pose). The gradient information may be indicative (for audio content) of changes of sub-band energy levels (e.g., of each channel) in response to translation and/or rotation of the user (e.g., the user's head). The method may further include transmitting the gradient information to the first apparatus together with the rendered media content. The method may further include comparing, at the first apparatus, the pose information that has been used for rendering the media content to current pose information. The pose information that has been used (by the second apparatus) for rendering the media content may be transmitted to the first apparatus together with the rendered media content. In case that this pose information is not sent to the first apparatus together with the rendered media content, the first apparatus may refer to the pose information that it had sent to the second apparatus. The current pose information may be pose information that is obtained at the time of reproducing the rendered media content, for example. The method may yet further include updating the rendered media content based on the gradient information and a result of the comparison. Updating the rendered media content may be performed based on a difference between the pose information that has been used for rendering the media content and the current pose information. Said updating may involve extrapolation of the rendered media content, for example by rotation, level changes and/or blind upmixing.

Thereby, small imperfections in the prediction of the pose information can be corrected for and any mismatch between pose and reproduced media content can be avoided.

In some embodiments, the media content may include audio content and the rendered media content may include rendered audio content. Then, the method may further include transmitting environmental information indicative of acoustic characteristics of an environment in which the first apparatus is located to the second apparatus. In this case, the rendering the media content may be further based on the environmental information. The environmental information may include room characteristics and/or Binaural Room Impulse Response (BRIR) functions.

This enables to specifically adapt the reproduced media content to the particular environment in which the user is located, thereby enhancing the user's computer mediated reality experience.

In some embodiments, the media content may include audio content and the rendered media content may include rendered audio content. Then, the method may further include transmitting morphologic information indicative of a morphology of the user or part of the user to the second apparatus. In this case, the rendering the media content may be further based on the morphologic information. Morphology may include or correspond to shape or size, e.g., a shape or size of the user's head. The morphologic information may include Head-Related Transfer Functions (HRTFs). The rendering may be binaural rendering.

This enables to specifically adapt the reproduced media content to the particular morphology of the user or part of the user, thereby enhancing the user's computer mediated reality experience.

Further aspects of the disclosure relate to a first apparatus, a second apparatus, and a system of a first apparatus and a second apparatus in accordance with (e.g., implementing) the above aspect and its embodiments.

Thus, another aspect of the disclosure relates to a system comprising a first apparatus for reproducing media content and a second apparatus storing the media content. The first apparatus may be adapted (configured) to obtain pose information indicative of a position and/or orientation of a user. The first apparatus may be further adapted (configured) to transmit the pose information to the second apparatus. The second apparatus may be adapted (configured) to render the media content based on the pose information to obtain rendered media content. The second apparatus may be further adapted (configured) to transmit the rendered media content to the first apparatus for reproduction. For example, the first and second apparatus may include respective processors (or respective sets of processors) and memories coupled to respective processors (or respective sets of processors). The processors may be adapted (configured) to carry out the operations set out above.

Another aspect of the disclosure relates to a second apparatus for providing media content for reproduction by a first apparatus. The second apparatus may be adapted (configured) to receive pose information indicative of a position and/or orientation of a user of the first apparatus. The second apparatus may be further adapted (configured) to render the media content based on the pose information to obtain rendered media content. The second apparatus may be yet further adapted (configured) to transmit the rendered media content to the first apparatus for reproduction. For example, the second apparatus may include a processor (or set of processors) and a memory coupled to the processor (or set of processors). The processor (or set of processors) may be adapted (configured) to carry out the operations set out above.

Another aspect of the disclosure relates to a first apparatus for reproducing media content provided by a second apparatus. The first apparatus may be adapted (configured) to obtain pose information indicative of a position and/or orientation of a user of the first apparatus. The first apparatus may be further adapted (configured) to transmit the pose information to the second apparatus. The first apparatus may be further adapted (configured) to receive rendered media content from the second apparatus. The rendered media content may have been obtained by rendering the media content based on the pose information. The first apparatus may be yet further adapted (configured) to reproduce the rendered media content. For example, the first apparatus may include a processor (or set of processors) and a memory coupled to the processor (or set of processors). The processor (or set of processors) may be adapted (configured) to carry out the operations set out above.

It is noted that any statements made with respect to methods likewise apply to corresponding systems and apparatus being used in such methods/systems, and vice versa.

Yet further aspects of the present disclosure relate to systems, apparatus, methods and computer readable storage media configured to perform the method for rendering audio content comprising receiving, by a sender (S) apparatus, user-position and/or orientation data and sending corresponding pre-rendered content, typically derived from an object-based or FOA/HOA representation. The pre-rendered signal generated by the sender can be binaural, FOA, HOA or any type of channel-based rendering. The method may further comprise transmitting uncompressed pre-rendered content. The method may further comprise encoding the prerendered content and transmitting the encoded pre-rendered content. The method may further comprise receiving the pre-rendered content by a receiver. The method may further comprise decoding the pre-rendered, pre-encoded binauralized content by a receiver. The user-position and/or orientation data may comprise of a local pose that indicates the user's position and orientation in world space. The user-position data may be transmitted to the sender from a receiver. The method may further comprise transmitting the user-position data used for the prerendered binauralized content back to the receiver. The method may further comprise extrapolating the pre-rendered content based on the received user-position data and the local position data to determine updated content. The method may further comprise transmitting morphological data about the user (e.g. head size) for individualized binaural processing. The method may further comprise transmitting data about BRIR and room characterization. The method may further comprise based on a determination that the content is transmitted in a listener-agnostic way (e.g. does not include HRTFs), performing binaural rendering and individualization at the receiver side. The method may further comprise providing the user position and/or orientation data P(t0) at a point in time t1. The uncompressed prerendered content may be binauralized uncompressed pre-rendered content.

BRIEF DESCRIPTION OF THE FIGURES

Example embodiments of the disclosure are explained below with reference to the accompanying drawings, wherein FIG. 1 illustrates a first example of a receiver;

FIG. 2 illustrates a second example of a receiver;

FIG. 9 illustrates a third example of a method of processing media content; and

FIG. 10 illustrates a fourth example of a method of processing media content.

DETAILED DESCRIPTION

Figure 3:
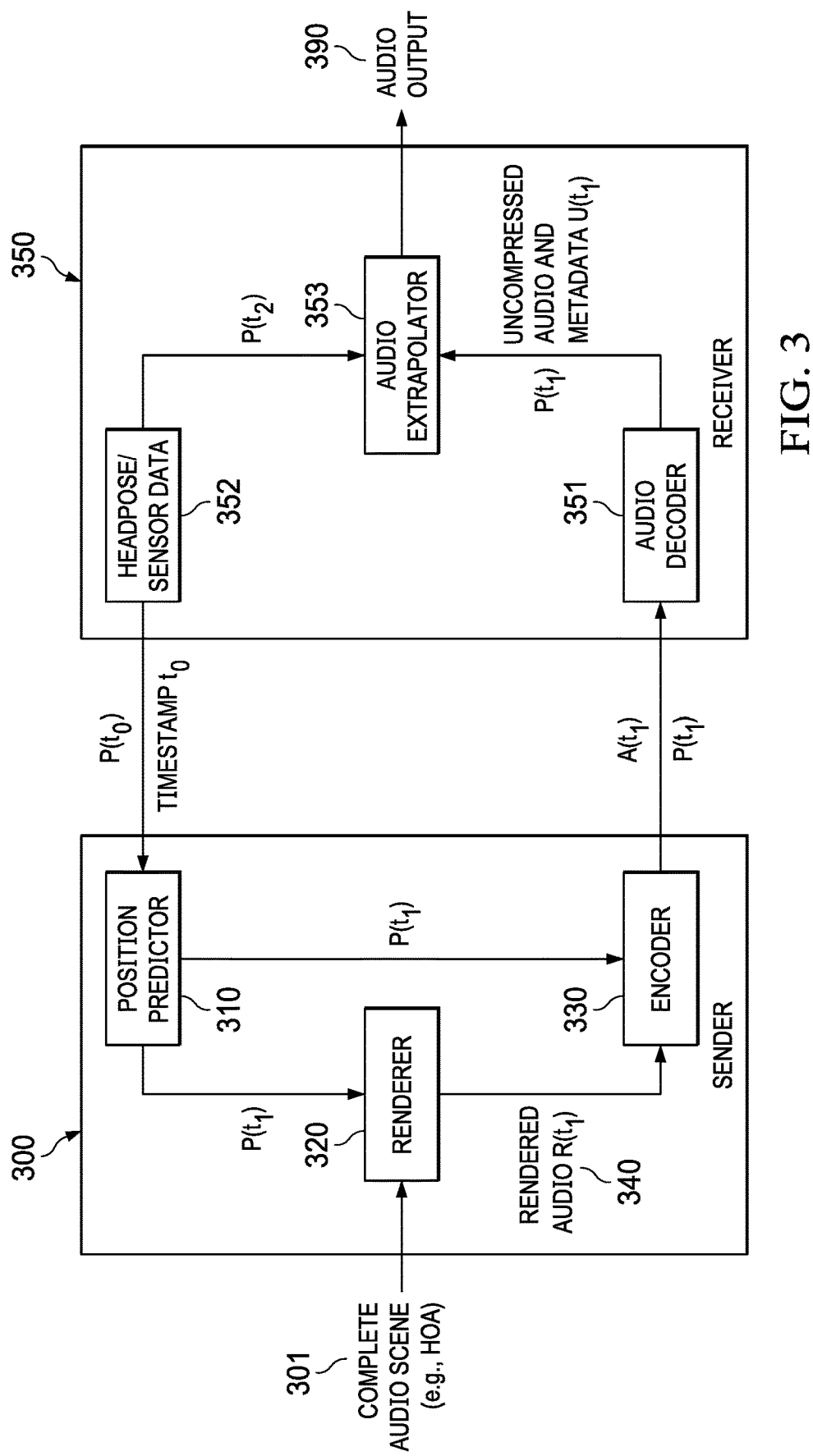
FIG. 3 illustrates a first example of a receiver and server system.

As will be appreciated by those skilled in the art, complete immersion in a virtual world "tricks" one's brain into believing what is being sensed. When sight is limited by the field of view, sound adds dimension for what is not visible (e.g., a bull charging from behind, a rattlesnake to the right, even a whisper moving from the left ear from behind the head to the right ear). Hence, content creators can leverage sound to direct the gaze of a user and thereby effectively tell a story. Immersive audio experiences are now being delivered in the Cinema and Home Theatre through object- or First/Higher Order Ambisonics (FOA/HOA)-based sound creation, packaging and playback of content. VR sound necessitates sound precision for complete immersion in a virtual world. Creators of VR content require the capability to create object and/or HOA-based sound in a three-dimensional space. Moreover, such content needs to be encoded, delivered, decoded and rendered binaurally (on headphones or over loudspeakers) with the precision and efficiency that allows a user to enjoy the content.

A receiver may select a media format representation of content, such as over-the-top (OTT) content delivered via the MPEG-DASH or MPEG-MMT format, based on various parameters, e.g., bandwidth and media bit rate. The receiver may also receive information regarding media consumption. The selection of the media format representation may be based off of such media consumption. For example, pre-rendered binauralized data may be selected based on an indication of head phones or stereo-loudspeakers (e.g., with cross-talk cancellation) output.

Example embodiments described herein describe methods, apparatuses and processes which are adapted to process media content (e.g., render audio content). Although the example embodiments generally relate to processing media content (e.g., comprising audio content and/or video content), reference may be made to audio content in the remainder of the present document, without intended limitation.

FIG. 1 illustrates an example of a receiver/client system 100 for binaural rendering. The system 100 may receive an audio input 101. The audio input 101 may include a full scene contained in an encoded bit stream from a sender. The receiver system 100 may receive or detect sensor data (pose information) 110 relating to user movements and/or user head orientation. The sensor data 110 may include information regarding an orientation and a position, such as, for example yaw, pitch, roll and/or (x, y, z) coordinates. The receiver system 100 may further include a decoder 102 that may decode the audio input 101 into uncompressed audio and/or metadata 120. The receiver system 100 may further include a render 103 that may render the uncompressed audio and/or metadata 120 to a binaural output 150. The receiver system 100 may output the binaural output 150 to, for example, a headphone output.

The receiver/client system 100 illustrated in FIG. 1 may suffer from the issues relating to latency and/or computational complexity that have been described at the outset of this document.

To address these issues, the present disclosure proposes, in a system for processing media content (e.g., including audio and/or video content), to obtain pose information for a user at the receiver, transmit the pose information to the sender, render the media content based on the pose information, and transmit the rendered media content to the receiver. Thereby, computational complexity of operations to be carried out at the receiver-side can be significantly reduced. Further, the rendered media content may be transmitted in uncompressed form, which can reduce the delay between a change of pose (e.g., head movement) and perception of the reproduced media content (e.g., perception of sound) adapted to this change of pose.

Figure 7:
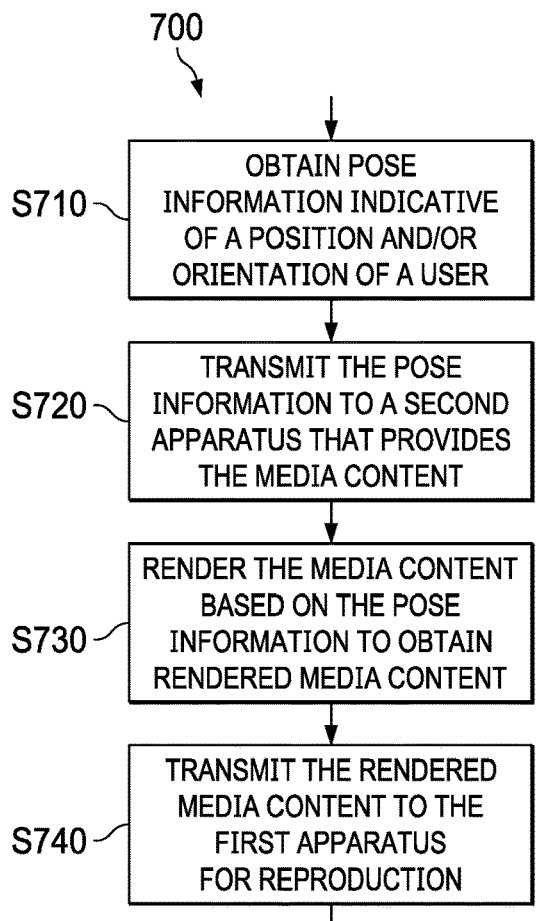
FIG. 7 illustrates a first example of a method of processing media content.

FIG. 7 is a flowchart schematically illustrating an example of a method 700 of processing media content in accordance with the above considerations. The media content may comprise audio content and/or video content. The audio content may for example be FOA-based audio content, HOA-based audio content, object-based audio content, channel-based audio content, or combinations thereof. The processing of the media content may involve rendering the media content. The method may be performed in a system comprising a first apparatus for reproducing the media content and a second apparatus for providing the media content. Reproducing the media content may involve replaying the media content. The first apparatus may be referred to as a receiver, receiver apparatus, client, client apparatus, or replay apparatus, for example. The first apparatus may comprise, correspond to, or operate in conjunction with computer-mediated reality (e.g., VR, AR, MR) equipment, such as a VR/AR/MR headset (e.g., goggles), for example, and may be associated with a user. The user may wear the computer-mediated reality equipment. The first apparatus may comprise or be (communicatively) coupled to a sensor (e.g., pose sensor) for detecting a pose (e.g., position and/or orientation) of the user or part of the user (e.g., the user's head). The sensor may further detect a change rate of the pose (first derivative(s), e.g., velocity, angular velocity/velocities, yaw/roll/pitch rate(s)). The sensor may yet further detect a change rate of the change rate (second derivative(s), e.g., acceleration, angular acceleration(s)). Sensor data output by the sensor may be referred to as pose information. It is understood that, generally, the pose information is indicative of a position and/or orientation (pose) of the user or part of the user (e.g., the user's head). Further, the pose information may be indicative of one or more change rates (first derivatives) of the pose. Yet further, the pose information may be indicative of one or more change rates of change rates (second derivatives), e.g., change rates of the one or more change rates of the pose. The sensor may be arranged in registration with the user or the relevant part of the user (e.g., head), for example as part of the computer-mediated reality equipment (e.g., VR/AR/MR headset/goggles), or as part of a mobile (computing) device carried by the user (e.g., smartphone, game controller). In this case the sensor may be referred to as an embedded sensor. Alternatively, the sensor may be provided with or embodied by a positional server (e.g., in an OptiTrack system or OptiTrack-type system) that keeps track of the pose of the user (or of part of the user). In general, the sensor may be part of or embodied by a tracking system that keeps track of the pose of the user (or of part of the user). Such positional server may also keep track of pose of more than one user. The second apparatus may be referred to as a sender, sender apparatus, server, server apparatus, or content delivery apparatus, for example. Each of the first and second apparatus may comprise a processor (or set of processors) that is coupled to a respective memory and that is adapted (configured) to perform respective operations set out below. For example, said processors (or sets of processors) may be adapted (configured) to perform respective steps of method 700 described below. Alternatively, or additionally, said processors (or sets of processors) may be adapted (configured) to perform respective steps of any one of method 800, method 900, and method 1000 described further below.

At step S710, the pose information indicative of a position and/or orientation of the user (or part of the user, e.g. the user's head) is obtained (e.g., determined). This operation may be performed for example by means of the sensor (e.g., pose sensor). At step S720, the pose information is transmitted to the second apparatus. At step S730, the media content is rendered based on the pose information to obtain rendered media content. That is, the media content is rendered based on a position and/or orientation of the user or the part of the user. The rendered media content may be referred to as pre-rendered media content (e.g., pre-rendered audio content and/or pre-rendered video content). If the media content comprises audio content, the audio content may for example be rendered to binaural audio content, B-format audio content, HOA audio content, channel-based audio content, or combinations thereof. In general, the audio content may be rendered to two or more channels and/or components. If the media content comprises video content, the video content may be tiled and a region of interest of an overall video scene may be output as rendered video content, for example. At step S740, the rendered media content is transmitted to the first apparatus for reproduction. Steps S710 and S720 may be performed at/by the first apparatus, e.g., by the sensor (e.g., pose sensor) and a (first) transmission unit, respectively. Steps S730 and S740 may be performed at/by the second apparatus, e.g., at a renderer and a (second) transmission unit.

For audio content, method 700 may further comprise a step of generating an audible (e.g., acoustic) representation of the rendered audio content, for example via two or more loudspeakers that are part of or coupled to the first apparatus. The two or more loudspeakers may be part of the computer mediated reality equipment, for example. For video content, method 700 may further comprise a step of generating a visual representation of the rendered video content, for example via a display device that is part of or coupled to the first apparatus. The display device may be part of the computer mediated reality equipment, for example. In general, generating such representations may be performed at/by the first apparatus.

An example of a receiver/client system 200 for binaural rendering in accordance with the above method is schematically illustrated in FIG. 2. The system may embody the first apparatus in method 700. The system 200 may receive, as an example of rendered media content (rendered audio content), an audio input 201. The audio input 201 may be in the form of a binauralized, uncompressed audio, for example. The receiver system 200 may output sensor data (as an example of pose information) relating to user movement and/or user head orientation. The HeadPose/sensor data 220 may include information regarding yaw, pitch, roll and/or (x, y, z) coordinates, for example. The receiver system 200 may output the sensor data to a sender/server. The sender/server may embody the second apparatus in method 700. The receiver system 200 may further generate an audible representation of the audio input 201. For example, the receiver system may output the uncompressed audio input 201 to a headphone output.

As will be described in more detail later, any of the systems illustrated in FIG. 3, FIG. 4, FIG. 5, and FIG. 6 may implement method 700.

To further reduce the delay between a change of pose and a corresponding adaptation of a representation of the media content that is presented to the user, the second apparatus may predict pose information to anticipate a delay that might result from transmission to the first apparatus and/or encoding/decoding (described below). For example, rendering the media content at step S730 in method 700 may involve obtaining (e.g., determining, calculating) the predicted pose information and rendering the media content based on the predicted pose information (instead of based on the pose information received from the first apparatus).

Figure 8:
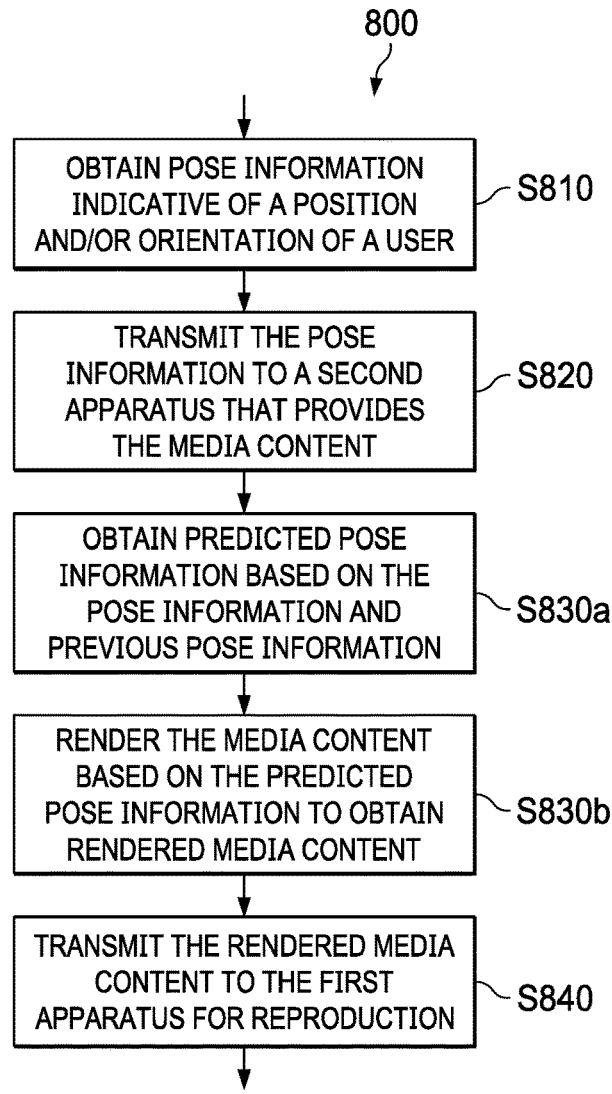
FIG. 8 illustrates a second example of a method of processing media content.

FIG. 8 is a flowchart schematically illustrating an example of a method 800 of processing media content that applies prediction of pose information. Unless indicated otherwise, statements made in connection with method 700 above apply also here.

Step S810 and step S820 correspond to steps S710 and S720, respectively, in method 700. At step S830*a*, predicted pose information is obtained (e.g., determined, calculated) based on the pose information received at step S820 and previous pose information. If the pose information comprises first and/or second derivatives of the pose, the prediction may be based on said first and/or second derivatives, in addition to, or instead of, the previous pose information. The predicted pose information may be pose information for a future timing, e.g., indicate position and/or orientation of the user or a part (e.g., head) of the user at a future timing. In certain implementations, the predicted pose information may be predicted for an estimate of a timing at which the rendered media content is expected to be processed by the first apparatus for reproduction. The estimate of the timing at which the first apparatus is expected to process the rendered media for reproduction may include an estimate of a time (duration) that is necessary or transmitting the rendered media content to the first apparatus. Alternatively, or additionally, if encoding/decoding (e.g., compression/decompression) is applied (described below), the estimate of said timing may include an estimate of a time (duration) that is necessary for encoding/decoding the rendered media content. That is, the predicted pose information may be obtained further based on the estimate of the time that is necessary for transmitting the rendered media content and/or the time that is necessary for encoding/decoding the rendered media content. The previous pose information may be pose information that has been received from the first apparatus at a previous timing. One or more items of previous pose information may be used to obtain the predicted pose information, for example via extrapolation or model-based prediction techniques. To this end, items (e.g., a predetermined number of items) of previous pose information may be stored. At step S830*b*, the media content is rendered based on the predicted pose information to obtain the rendered media content. This operation may differ from step S730 in method 700 in that the predicted pose information instead of the pose information (received at step S720 or step S820) is used, but otherwise may be performed in the same manner as step S730. At step S840, the rendered media content is transmitted to the first apparatus for reproduction. Steps S810 and S820 may be performed at/by the first apparatus. Steps S830*a*, S830*b*, and S840 may be performed at/by the second apparatus. Step S830*a* may be performed by a pose predictor, for example.

For audio content, method 800 may further comprise a step of generating an audible (e.g., acoustic) representation of the rendered audio content, for example via two or more loudspeakers that are part of or coupled to the first apparatus. The two or more loudspeakers may be part of the computer mediated reality equipment, for example. For video content, method 800 may further comprise a step of generating a visual representation of the rendered video content, for example via a display device that is part of or coupled to the first apparatus. The display device may be part of the computer mediated reality equipment, for example. In general, generating such representations may be performed at/by the first apparatus.

In a modification of method 800, the predicted pose information may be predicted at the first apparatus. That is, the first apparatus may perform processing as described above with reference to step S830*a*, and subsequently send the predicted pose information to the second apparatus. It is understood that step S820 may be omitted in this case. After receiving the predicted pose information from the first apparatus, the second apparatus may continue its processing with step S830*b* and subsequent steps, in the manner described above.

As will be described in more detail later, any of the systems illustrated in FIG. 3, FIG. 4, FIG. 5, and FIG. 6 may implement method 800 or the modification of method 800.

The above prediction of pose information for rendering the media content allows to "conceal" the delay that is caused by transmission and/or encoding/decoding, so that good alignment between user movement and presentation of rendered media content can be achieved. Accordingly, the risk that the user is affected by motion-sickness can be reduced or altogether avoided, and the user's immersive computer mediated reality experience can be improved. In the case of method 800, improvement of alignment between movement and presentation of rendered media content is achieved by a process performed at the server/sender side, i.e., by predicting the pose information and using the predicted pose information instead of the pose information received from the receiver/replay side for rendering the media content. However, under certain conditions it may be desirable to achieve such improvement of alignment between movement and presentation of rendered media content by measures that are performed at the receiver or replay side.

FIG. 9 is a flowchart schematically illustrating an example of a method 900 of processing media content in accordance with the above considerations, i.e., that improves alignment between movement and presentation of rendered media content by measures that are performed at the receiver/replay side.

Step S910, step S920, step S930, and step S940 correspond to steps S710 to S740, respectively, in method 700. At step S950, the pose information that has been used for rendering the media content (e.g., the pose information that has been received from the first apparatus) is transmitted to the first apparatus. Said pose information may be transmitted together with the rendered media content, e.g., in association with the rendered media content. At step S960, the pose information that has been used for rendering the media content is compared to current pose information. The current pose information may be pose information that is obtained at the time of reproducing (e.g., replaying) the rendered media content. The current pose information may be obtained in the manner described above with reference to step S710, albeit at different (later) timing. At step S970, the rendered media content is updated based on a result of the comparison. For example, the rendered media content may be updated based on a difference between the pose information that has been used for rendering the media content and the current pose information. Said updating may involve extrapolation of the rendered media content. Non-limiting examples of such updating will be described below with reference to FIG. 3. Steps S910, S920, S960, and S970 may be performed at/by the first apparatus. Steps S930, S940, and S950 may be performed at/by the second apparatus.

In certain implementations, step S950 may be omitted, i.e., the pose information that has been used for rendering the media content may not be transmitted to the first apparatus. In this case, it could be referred to, at step S960, to the pose information that had been sent to the second apparatus at step S920, as the pose information that has been used for rendering the media content.

Further, in certain implementations method 900 may comprise determining gradient information of how the rendered media content changes in response to changes of the pose information (e.g., in response to changes of the user's pose or the pose of the user's head). Then, method 900 may yet further comprise transmitting the gradient information to the first apparatus. For example, the gradient information may be transmitted to the first apparatus together with (e.g., in association with) the rendered media content and optionally the pose information that has been used for rendering the media content. These additional steps may be performed at the second apparatus. For audio content, the gradient information may be indicative of changes of sub-band energy levels (e.g., of each channel or each component) in response to translation and/or rotation of the user or the part of the user. The gradient information may then be used at step S970 to update/adjust the rendered media content. For example, sub-band energy levels of the rendered audio content may be adjusted based on the gradient information and the difference between the pose information that has been used for rendering the media content and the current pose information. In general terms, the rendered media content may be updated/adjusted based on a difference in pose and gradients that indicate changes of the rendered media content responsive to changes of the pose.

For audio content, method 900 may further comprise a step of generating an audible (e.g., acoustic) representation of the rendered audio content, for example via two or more loudspeakers that are part of or coupled to the first apparatus. The two or more loudspeakers may be part of the computer mediated reality equipment, for example. For video content, method 900 may further comprise a step of generating a visual representation of the rendered video content, for example via a display device that is part of or coupled to the first apparatus. The display device may be part of the computer mediated reality equipment, for example. In general, generating such representations may be performed at/by the first apparatus.

As will be described in more detail later, any of the systems illustrated in FIG. 3, FIG. 4, FIG. 5, and FIG. 6 may implement method 900.

To further improve alignment between user movement and presentation of rendered media content, the prediction of pose information at the server/sender side and the updating of rendered media content at the receiver/replay side may be combined.

FIG. 10 is a flowchart schematically illustrating an example of a method 1000 of processing media content in accordance with the above considerations, i.e., that improves alignment between movement and presentation of rendered media content by measures that are performed at the server/sender side as well as measures that are performed at the receiver/replay side.

Step S1010, step S1020, and step S1040 correspond to steps S710, S720, and S740, respectively, in method 700. Step S1030*a* and step S1030*b* correspond to steps S830 and S830*b*, respectively, in method 800. At step S1050, the predicted pose information (i.e., the pose information that has been used for rendering the media content) is transmitted to the first apparatus. The predicted pose information may be transmitted together with the rendered media content, e.g., in association with the rendered media content. At step S1060, the predicted pose information is compared to actual/current pose information. The actual pose information may be pose information that is obtained at the time of reproducing (e.g., replaying) the rendered media content. The actual pose information may be obtained in the manner described above with reference to step S710, albeit at different (later) timing. At step S1070, the rendered media content is updated based on a result of the comparison. For example, the rendered media content may be updated based on a difference between the predicted pose information and the actual pose information. In general, the updating may be performed in the same manner as in step S970 in method 900. Steps S1010, S1020, S1060, and S1070 may be performed at/by the first apparatus. Steps S1030*a*, S1030*b*, S1040, and S1050 may be performed at/by the second apparatus.

In certain implementations method 1000 may comprise determining gradient information of how the rendered media content changes in response to changes of the pose information (e.g., in response to changes of the user's pose or the pose of the user's head). Then, method 1000 may yet further comprise transmitting the gradient information to the first apparatus. For example, the gradient information may be transmitted to the first apparatus together with (e.g., in association with) the rendered media content and optionally the pose information that has been used for rendering the media content. These additional steps may be performed at the second apparatus. For audio content, the gradient information may be indicative of changes of sub-band energy levels (e.g., of each channel or each component) in response to translation and/or rotation of the user or the part of the user. The gradient information may then be used at step S1070 to update/adjust the rendered media content. For example, sub-band energy levels of the rendered audio content may be adjusted based on the gradient information and the difference between the pose information that has been used for rendering the media content and the current pose information. In general terms, the rendered media content may be updated/adjusted based on a difference in pose and gradients that indicate changes of the rendered media content responsive to changes of the pose.

For audio content, method 1000 may further comprise a step of generating an audible (e.g., acoustic) representation of the rendered audio content, for example via two or more loudspeakers that are part of or coupled to the first apparatus. The two or more loudspeakers may be part of the computer mediated reality equipment, for example. For video content, method 1000 may further comprise a step of generating a visual representation of the rendered video content, for example via a display device that is part of or coupled to the first apparatus. The display device may be part of the computer mediated reality equipment, for example. In general, generating such representations may be performed at/by the first apparatus.

In a modification of method 1000, the predicted pose information may be predicted at the first apparatus. That is, the first apparatus may perform processing as described above with reference to step S1030*a*, and subsequently send the predicted pose information to the second apparatus. It is understood that step S1020 may be omitted in this case. After receiving the predicted pose information from the first apparatus, the second apparatus may render the media content in the manner described above with reference to step S1030*b*, using the predicted pose information, and transmit the rendered media content to the first apparatus, in the manner described above with reference to step S1040. Step S1050 may be omitted in this case. After receiving the rendered media content, the first apparatus may perform steps S1060 and S1070, in the manner described above. Notably, since the prediction of pose information is performed at the first apparatus in this case, the first apparatus does not need to receive the predicted pose information from the second apparatus.

As will be described in more detail later, any of the systems illustrated in FIG. 3, FIG. 4, FIG. 5, and FIG. 6 may implement method 1000 or the modification of method 1000.

In any of the above methods, the rendered media content may be transmitted to the first apparatus in uncompressed form. This is enabled by the pre-rendering at the second apparatus, so that transmission of the full media content (e.g., a complete representation of an audio/video scene) is not necessary. Transmitting the rendered media content in uncompressed form contributes to reducing the round-trip delay, since time that is conventionally spent for compressing/decompressing can be saved. On the other hand, the rendered media content may be encoded (compressed) before transmission to the first apparatus if required by bandwidth limitations. In this case, as mentioned above, a time necessary for encoding/decoding (e.g., compressing/decompressing) may be taken into account when obtaining predicted pose information.

Further, for audio content any of the above methods may further comprise transmitting environmental information indicative of acoustic characteristics of an environment in which the first apparatus is located to the second apparatus. The environmental information may include room characteristics and/or Binaural Room Impulse Response (BRIR) functions. This step may be performed at/by the first apparatus, e.g., at the time of setup. Then, the audio content may be rendered further based on the environmental information. Alternatively, or additionally, any of the above methods may further comprise transmitting morphologic information indicative of a morphology of the user or part of the user to the second apparatus. Morphology may include or correspond to shape or size, e.g., a shape or size of the user's head. The morphologic information may include Head-Related Transfer Functions (HRTFs). The rendering may be binaural rendering. This step may be performed at/by the first apparatus, e.g., at the time of setup. Then, the audio content may be rendered further based on the morphologic information.

FIG. 3 illustrates further details of an exemplary system that includes a server/sender 300 and a client/receiver 350. As noted above, this system may implement any of methods 700, 800, 900, and 1000. The server/sender 300 (e.g., implementing the second apparatus) may include a renderer 320 (e.g., an audio renderer) and an encoder 330. The client/receiver 350 (e.g., implementing the first apparatus) may send a current Pose (e.g., HeadPose) P(t0) at point in time t0 to the server/sender 300. The current Pose P(t0) may also include the timestamp t0 itself, which specifies the time when the current Pose P(t0) was created. The Pose P(t0) may be determined and sent by a Pose 350 block.

The server/sender 300 (e.g., implementing the second apparatus) may further comprise a Position Predictor 310. The server/sender 300 may receive user position and the current Pose P(t0) (corresponding to a head orientation) at a point in time t1, where t1>t0. The received current Pose P(t0) and t0 itself may be used by the Position Predictor 310 to predict a position P(t1). The Position Predictor 310 may take a previously received Pose P(tn) and tn into account for predicting the position P(t1), where n can be 0 to -infinity (Pose and timestamp values from earlier points in time). The position P(t1) may be similar to the Pose P(t0). The position P(t1) may be used by an audio renderer 320 to render the audio scene at a point in time t1 and thereby determine a rendered audio data R(t1) 340. The rendered audio data R(t1) 340 may be encoded using an audio encoder 330 to determine audio data A(t1). The server/sender 300 may send the audio data A(t1) and a position P(t1) to the client/receiver 350. The position P(t1) may be encoded as part of an audio bitstream. The client/receiver 350 may receive the audio data A(t1) and position P(t1) (e.g., in form of metadata) from the server/sender 300 at a point in time t2, where t2>t1. The client/receiver 350 may receive the audio data A(t1) and position P(t1) at an audio decoder 351 which may determine uncompressed audio U(t1). The HeadPose/Sensor Data 352 block may determine a Pose P(t2) at the point in time t2. An audio extrapolator 353 may use the received P(t1) to calculate the Pose difference DeltaP by subtracting Pose P(t1) from the Pose P(t2) at the point in time t2. DeltaP may be used by the audio extrapolator 353 to adapt/extrapolate the uncompressed audio U(t1) before output 390. The client/receiver 350 may apply a local rotation as part of the extrapolation in the case the audio content is FOA and the motion is restricted to yaw, pitch and/or roll movement. The client/receiver 350 may further apply blind upmixing as part of the extrapolation in the case the audio content is pre-rendered binaural content or pre-rendered channel based content.

Instead of predicting the position P(t1), a position P(t2') may be predicted for a point in time t2' at which the client/receiver 350 is expected to receive or process the audio data. The point in time t2' may be estimated starting out from point in time t1, considering the times (durations) that are necessary for transmitting and/or encoding/decoding the audio data. P(t1), R(t1), A(t1), and U(t1) in the above would then have to be replaced by P(t2'), R(t2'), A(t2'), and U(t2'), respectively. Any of the elements described above may be implemented by a processor (or set of processors) of the respective apparatus.

The following syntax out of MPEG-H 3D Audio (ISO/IEC 23008-3) and/or future versions of the MPEG standard may be used for transmitting P(t) 3 Degrees of Freedom (3DoF) data:

TABLE 1

| Syntax | No. of bits | Mnemonic |
| --- | --- | --- |
| mpegh3daSceneDisplacementData( ) { | | |
| sd_yaw; | 9 | uimsbf |
| sd_pitch; | 9 | uimsbf |
| sd_roll; | 9 | uimsbf |
| } | | |

The semantics may be defined according to MPEG-H 3D Audio (ISO/IEC 23008-3) and/or future versions of the MPEG standard.

A full syntax for transmitting 6DoF data and a timestamp may look like the following:

TABLE 2

| Syntax | No. of bits |
| --- | --- |
| Head_pose( ) { | |
| if (b_yaw) { | 1 |
| yaw; | 9 |
| } | |
| if (b_pitch) { | 1 |
| pitch; | 9 |
| } | |
| if (b_roll) { | 1 |
| roll; | 9 |
| } | |
| if (b_x_pos) { | 1 |

TABLE 2-continued

| Syntax | No. of bits |
| --- | --- |
| x_pos; | 9 |
| } | |
| if (b_y_pos) { | 1 |
| y_pos; | 9 |
| } | |
| if (b_z_pos) { | 1 |
| z_pos; | 9 |
| } | |
| if (b_timestamp) { | 1 |
| timestamp; | variable |
| } | |
| if (PosDerivatives) { | 1 |
| d_x_pos | 9 |
| d_y_pos | 9 |
| d_z_pos | 9 |
| dd_x_pos | 9 |
| dd_y_pos | 9 |
| dd_z_pos | 9 |
| } | |
| if (OrientDerivatives) { | 1 |
| d_roll | 9 |
| d_pitch | 9 |
| d_yaw | 9 |
| dd_roll | 9 |
| dd_pitch | 9 |
| dd_yaw | 9 |
| } | |
| } | |

The semantics may be defined according to MPEG-H 3D Audio (ISO/IEC 23008-3) and/or future versions of the MPEG standard.

Figure 4:
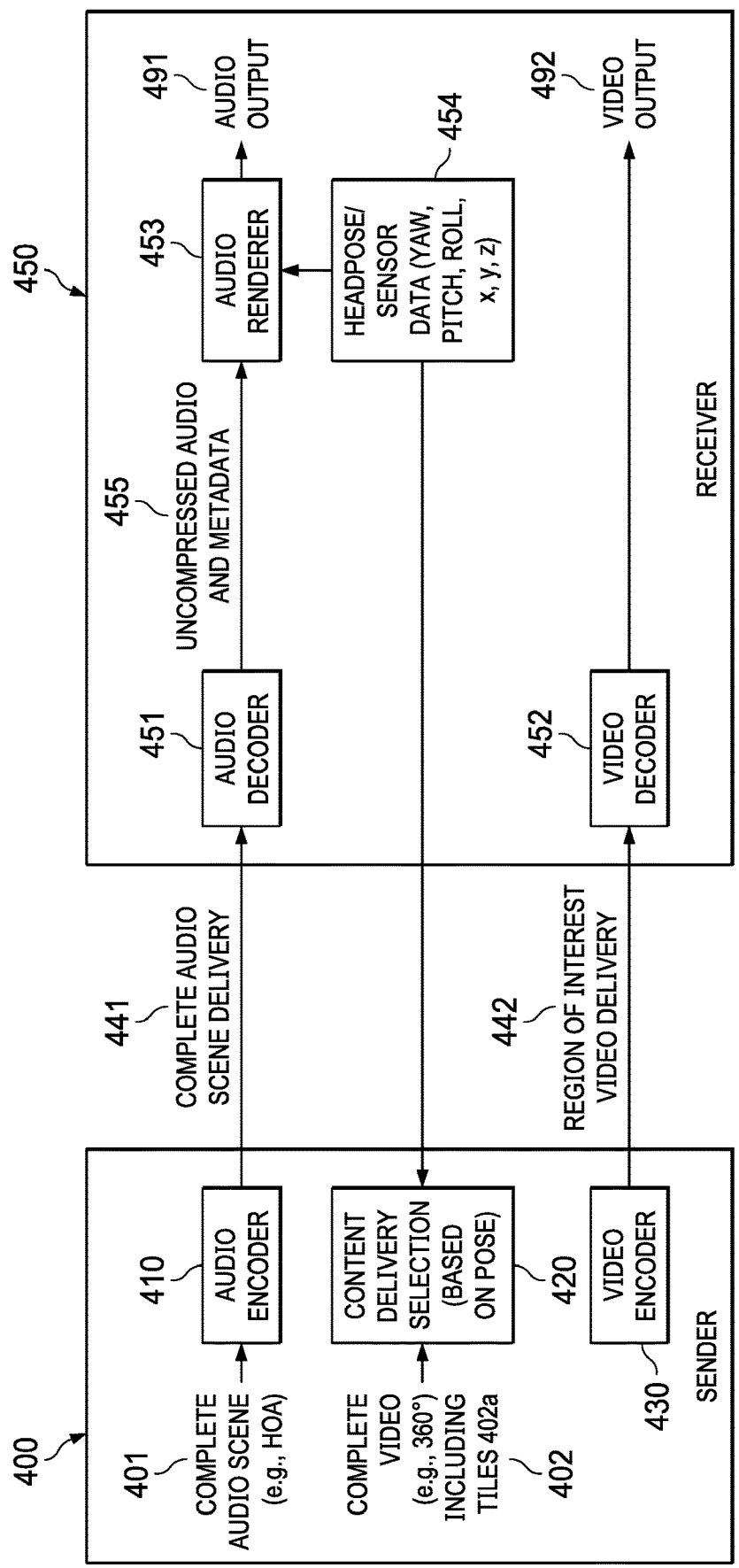
FIG. 4 illustrates a second example of a sender and receiver system.

FIG. 4 illustrates an exemplary system that includes a sender 400 and a receiver 450. The system described in FIG. 4 may include in whole or in part aspects of the systems described in FIGS. 1-3. In particular, the system may implement any or all of methods 700, 800, 900, and 1000 described above. The Sender/server 400 (e.g., implementing the second apparatus) may receive a complete audio scene (e.g., an FOA/HOA or object based scene) 401 and a complete video scene (e.g., a 360° video) 402 (as examples of media content). The audio scene 401 may be processed by audio encoder 410 to determine a complete audio scene delivery 441. The complete audio scene 441 may be composed of the entire audio scene and/or accompanying metadata (such as audio object positions, directions etc.). The complete video 402 may be processed by a content delivery selection 420. The complete video 420 may be split up into different parts such as regions of interest and "tiled" accordingly (a 360° video might be split up into tiles) by content selection 420 to determine tiles 402a. The content delivery and selection 420 may use a predicted position P(t1) (or predicted position P(t2')) as described as output from Position Predictor 310 in FIG. 3 or it may use unchanged HeadPose/Sensor Data 454. For example, the tiles 402a out of the complete 360° video 402 may be selected in content delivery selection 420, based on sensor data 454 received from the receiver 450. This selection may be referred to as rendering of video content. The video encoder 430 encodes the tiles 402a to output a region of interest video 442 that may be transmitted to a client/receiver 450 (e.g., implementing the first apparatus). The receiver 450 may include a video decoder 452 that may receive the region of interest video 442. The video decoder 452 may use the region of interest 442 to decode the video and output it to the video output 492. The complete audio scene 441 may be received by audio decoder 451 which may decode the content and provide the decoded audio scene to audio renderer 453. The audio decoder 451 may provide uncompressed audio and metadata 455 (which may correspond to the decoded audio scene) to the audio renderer 453. The audio renderer 453 may render the decoded audio based on sensor data 454 and may output the audio output 491. The sensor data 454 may be received from a sensor being able to detect user's movement and/or user's head orientation (e.g. a gyroscope-based sensor). It may then further be provided to audio renderer 453 in order to adapt the complete audio scene 441 to the user's current head-orientation and/or position and to content delivery selection 420 in order to adapt the complete video scene 402 to the user's current head-orientation and/or position. Notably, in the example system of FIG. 4 the video content is rendered at the server/sender side (i.e., video content ready for replay at the receiver/replay side is generated at the server/sender side), while the audio content is rendered at the receiver/replay side. Any of the elements described above may be implemented by a processor (or set of processors) of the respective apparatus.

Figure 5:
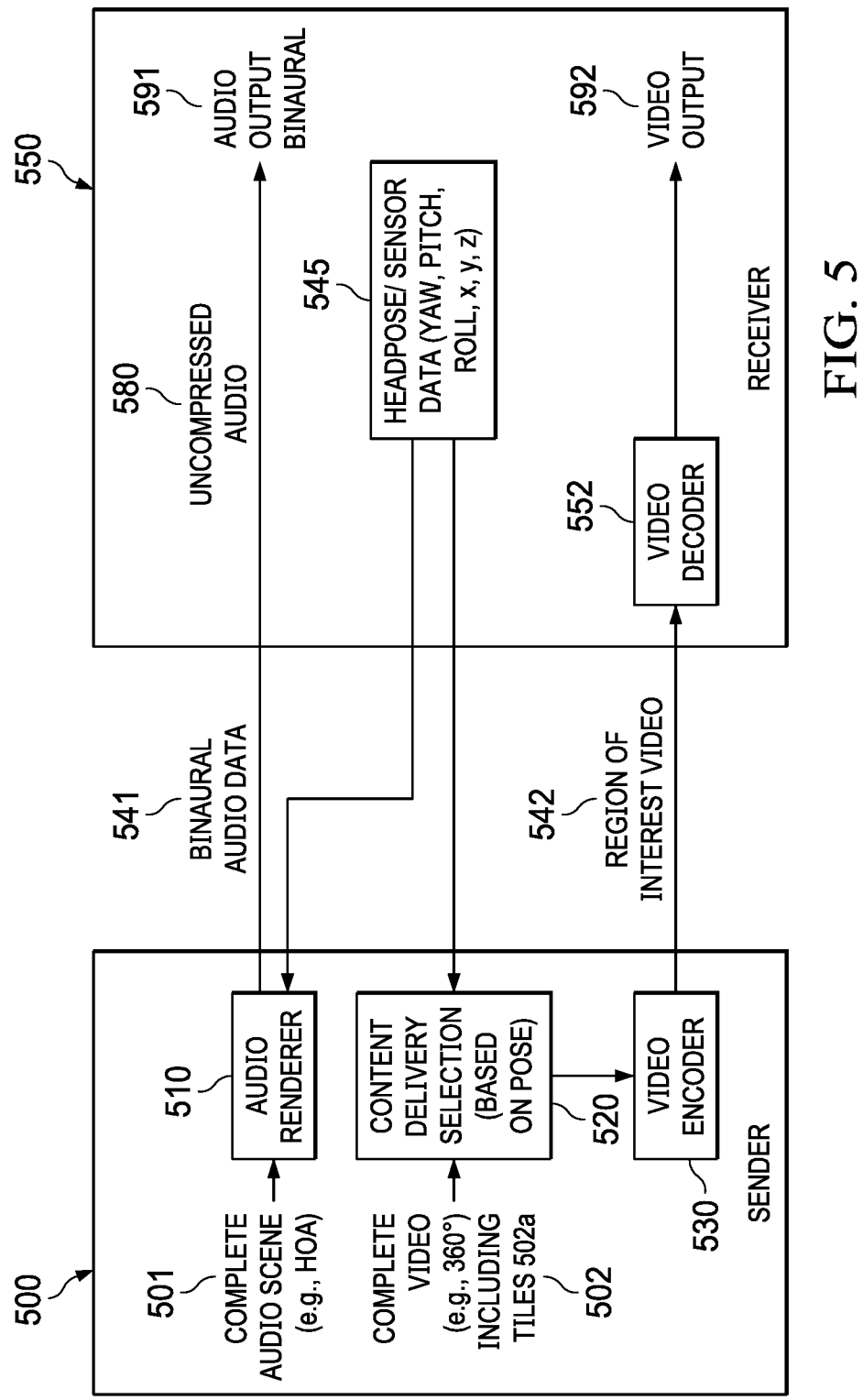
FIG. 5 illustrates a third example of a sender and receiver system.

FIG. 5 illustrates an exemplary system that includes a sender 500 and a receiver 550. The system may implement any or all of methods 700, 800, 900, and 1000 described above. The sender/server 500 (e.g., implementing the second apparatus) may receive a complete audio scene (e.g., an HOA or object based scene) 501 and a complete video scene (e.g., a 360° video) 502 (as examples of media content). The audio scene 501 may be processed by audio renderer 510 to determine binaural audio data 541. The audio renderer 510 may determine the binaural audio data 541 taking sensor data 545 into account. The sensor data 545 may include yaw, pitch, roll, x, y, z information. The binaural audio data 541 may be uncompressed, lossless compressed or lossy low-latency compressed. For example, the binaural audio data 551 may be uncompressed audio 580 which may be received by receiver 550 (e.g., implementing the first apparatus) and provided to binaural audio output 591. The complete video 502 may be processed by a content delivery selection 520. The complete video 502 may be split up into different parts such as regions of interest and "tiled" accordingly (a 360° video might be split up into tiles) in content delivery selection 520 to determine tiles 502a. The tiles 502a out of the complete 360° video 502 may be selected in content delivery selection 520 based on sensor data 545 received from the receiver 550. This selection may be referred to as rendering of video content. The video encoder 530 encodes the tiles 502a to output a region of interest video 542 that may be transmitted to a client/receiver 550. The receiver 550 may include a video decoder 552 that may receive the region of interest video 542. The video decoder 552 may use the region of interest 542 to decode the video and output it to the video output 592. The sensor data 545 may be received from a sensor being able to detect user's movement and/or user's head orientation (e.g. a gyroscope-based sensor). It may then further be provided to content delivery selection 520 in order to adapt the complete video scene 502 to the user's current head orientation and/or position. It may then further be provided to content audio renderer 510 in order to adapt the complete audio scene 501 to the user's current head-orientation and/or position. Any of the elements described above may be implemented by a processor (or set of processors) of the respective apparatus.

Figure 6:
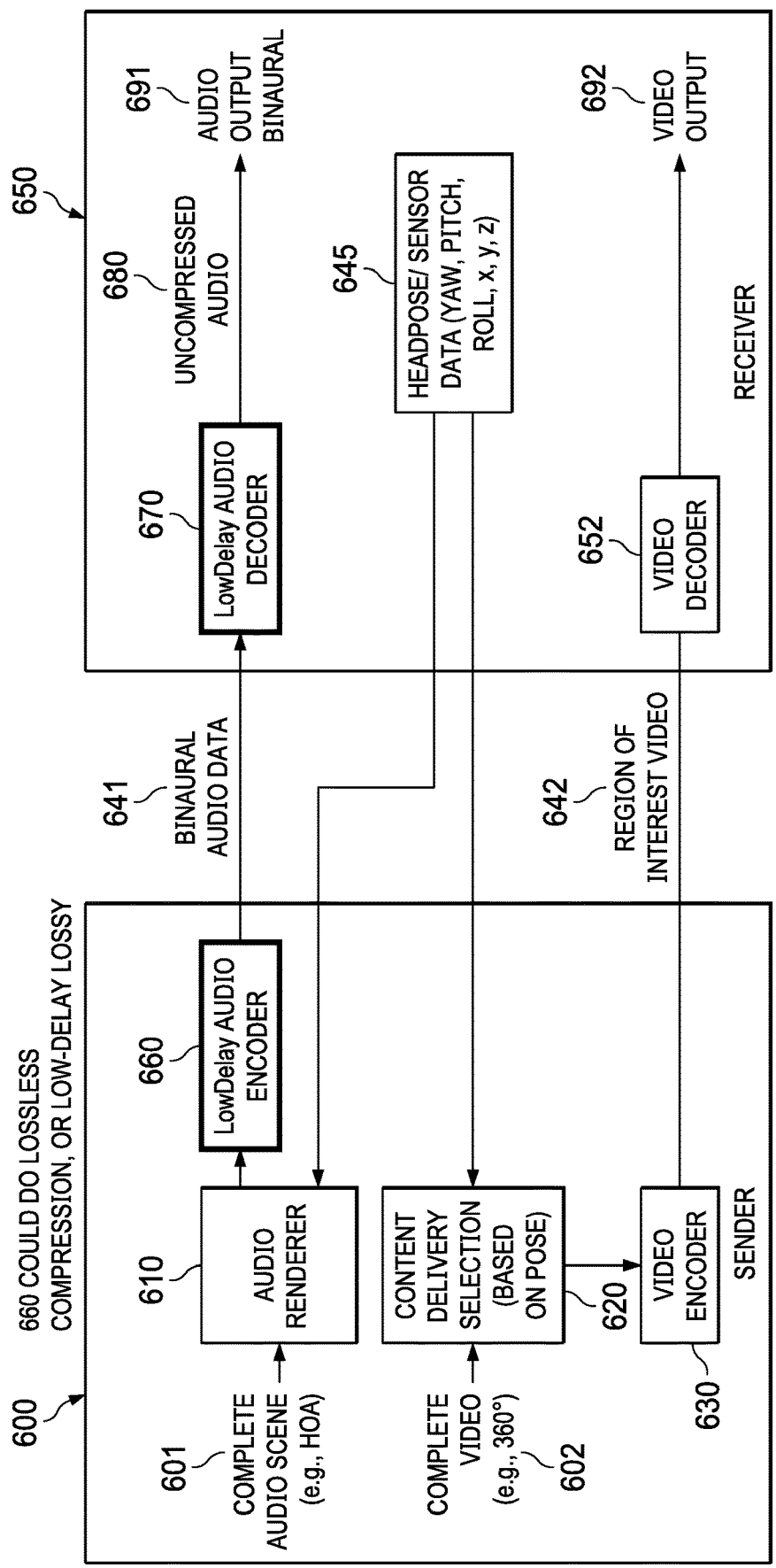
FIG. 6 illustrates a fourth example of a sender and receiver system.

FIG. 6 illustrates an exemplary system that includes a sender 600 and a receiver 650. The system may implement any or all of methods 700, 800, 900, and 1000 described above. The sender/server 600 (e.g., implementing the second apparatus) may receive a complete audio scene (e.g., an HOA or object based scene) 601 and a complete video scene (e.g., a 360° video) 602 (as examples of media content). The audio scene 601 may be processed by audio renderer 610 and the output of audio renderer 610 may then be processed by the LowDelay audio encoder 660. The audio renderer 610 may take into account sensor data 645. The LowDelay audio encoder 660 may output Binaural Audio data 641 which may then be sent to a receiver 650 (e.g., implementing the first apparatus). The Binaural Audio data 641 may be received at receiver 650 by a LowDelay Audio Decoder 670 which converts the Binaural Audio data 641 into uncompressed audio 680. The uncompressed audio 680 may then be provided to binaural audio output 691. The complete video 602 may be processed by a content delivery selection 620. The complete video 602 may be split up into different parts such as regions of interest and "tiled" accordingly (a 360° video might be split up into tiles) in content delivery selection 620 to determine tiles that may be selected in content delivery selection 620 based on sensor data 645 received from the receiver 650. This selection may be referred to as rendering of video content. The video encoder 630 encodes the tiles and/or video to output a region of interest video 642 that may be transmitted to a client/receiver 650. The receiver 650 may include a video decoder 652 that may receive the region of interest video 642. The video decoder 652 may use the region of interest 642 to decode the video and output it to the video output 692. The sensor data 645 may be received from a sensor being able to detect user's movement and/or user's head orientation (e.g. a gyroscope-based sensor). It may then further be provided to content delivery selection 620 in order to adapt the complete video scene 602 to the user's current head orientation and/or position. It may then further be provided to content audio renderer 610 in order to adapt the complete audio scene 601 to the user's current head-orientation and/or position. Any of the elements described above may be implemented by a processor (or set of processors) of the respective apparatus.

Conventionally, audio (as a non-limiting example of media content) transmitted from a sender (S) to a receiver (R) is rendered at the receiver as shown in FIG. 1 and FIG. 4. To maximize flexibility at the receiver side, it is possible to send a complex representation of the audio scene, such as objects or HOA that can be adaptively rendered on the receive side, e.g. to match the local listener viewpoint/pose. However, encoding such representations may require large latencies that would prevent these approaches to be used for communication or interactive applications.

The present disclosure provides methods, systems, and apparatus for reducing mentioned latency and/or for reducing the computational complexity in a receiver. The user-position and orientation transmitted from the receiver to the sender allows the server/sender to compute a more compact, pre-rendered version of the content that closely matches the receiver current pose/viewpoint. However, transmission latency from the sender to the receiver will introduce a possible mismatch between the local receive pose and the pose for which the rendering was computed on the server. The present disclosure proposes that the sender signal the position for which the rendering was performed allowing the receiver to extrapolate the rendered signal to its current local pose. In addition, the sender may send a pre-rendered, uncompressed or lossy compressed representation of the audio scene in order to eliminate encoding and decoding latency in the system. The sender performs a rendering algorithm, e.g. toward a binaural stereo, FOA or HOA representation. The rendering algorithm may render the audio data, such as audio objects to two channels (e.g., pre-rendered binauralized content) to output channels. The channels may then be encoded, in particular if compression is needed (for example, depending on the bandwidth of the system) to output an encoded audio data bit stream. The signal may be transmitted to a client or receiver and it may be output via head phones or a stereo loudspeaker system.

When the binauralized playback needs to be adapted to the physics of a user's head, the receiver may transmit a Head-Related Transfer Function (HRTF) that corresponds to the properties of the user's head. The receiver may further transmit a Binaural Room Impulse Response (BRIR) function that corresponds to the room intended to reproduce. This information may be transmitted during setup of a transmission.

Embodiments of the present disclosure may provide at least the following advantages:

- If only binauralized (stereo) data is transmitted, the transmission bitrate for lossless audio data transmission may be similar or comparable to the bitrate of a complete compressed audio scene.
- Transmitting an uncompressed or lossless audio stream would eliminate or reduce latency for encoding and decoding. For example, the latency resulting from encoding/decoding may be reduced to zero, which will result in an overall reduction of motion-to-ear latency.
- When there is no compression of audio data the receiver would only output audio without decoding or rendering. This will result in a reduction of computational complexity at the receiver because no decoding needs to be performed and/or rendering has already been completed at the sender side.
- Different trade-offs may be taken between minimum latency and minimum receiver computational complexity at higher bitrate and minimal bitrate at higher latency and higher receiver computational complexity, e.g.:
  - Transmission of uncompressed data for minimal latency and computational complexity, but enough bandwidth to transmit uncompressed data.
  - Transmission of lossless compressed data for minimal latency and slightly higher computational complexity, if the bandwidth is not enough to transmit uncompressed data.
  - Transmission of lossy, but low-delay compressed data, for low latency and higher computational complexity, if the bandwidth is limited.

The above also applies to bi-lateral communication between R and S, when R and S are receivers and senders at the same time.

Table 3 shows an example of a system comparison illustrating such trade-offs.

TABLE 3

| Codec | Bitrate (transp. Qual.) | Enc. Latency | Dec. latency | Transmission latency | Overall latency | Receiver Comp. complexity | Output Flexibility |
| --- | --- | --- | --- | --- | --- | --- | --- |
| 3D Audio Codec | 800 kbps-1200 kbps | ~120 ms | ~40 ms | ~5 ms | ~165 ms | High | High |

TABLE 3-continued

| Codec | Bitrate (transp. Qual.) | Enc. Latency | Dec. latency | Transmission latency | Overall latency | Receiver Comp. complexity | Output Flexibility |
|---|---|---|---|---|---|---|---|
| Pre-Rendered lossless coding | 768 kbps | ~5 ms | ~0 ms | 2*~5 ms | ~15 ms | Low | Low |

In certain contexts, embodiments of the present disclosure may involve hiding transmission latency based on content extrapolation. When an overall latency (for example, transmission latency) is too high (typically above 20 msec), it is desirable that the encoding format and/or playback system provide a mean to extrapolate the content to match the local pose (position and orientation) of the receiver, while waiting for the delivery of the next updated content frame. The overall latency may be determined based on a sum of all latencies in a round trip of audio data. For example, the overall latency may be based off of a roundtrip latency, encoding latency, decoding latency and rendering latency.

Hiding this latency can be achieved by transmitting the local pose from receiver to a sender/server for rendering (as described above with reference to steps S920 and S1020, for example) and have the sender/server send back which pose was used for each rendered frame of content (as described above with reference to steps S950 and S1050, for example). The sender/sender may predict the user's movement in order to compensate for additional latency introduced between the time the content is rendered by the sender and received in the receiver, including taking previously received positions into account.

Then, the receiver can extrapolate the pre-rendered audio, received from the server, given the delta between the pose used to render the content on the sender side and the local pose (e.g., current or actual pose) of the receiver R (as described above with reference to steps S970 and S1070, for example).

This extrapolation can be implemented in several ways based on the flexibility of the rendered content. In one example, when the content is pre-rendered Ambisonics B-format and the motion is three degrees of freedom motion, the extrapolation may be based on a client-side local rotation of the FOA or B-Format content prior to playback. In another example, for pre-rendered binaural content, the extrapolation can be achieved by blind upmixing (see Appendix A) or by adding metadata to the binaural stream (see Appendix B). In another example, for pre-rendered channel-based content, a low latency blind upmixer can be applied at the receiving end.

If rendering and encoding are tightly integrated on the sender side, it is possible to increase the flexibility of the pre-rendered content by adding metadata encoding, e.g. the direction/distance of different subbands or energy gradients based on the current rendering position P, $\nabla E(P)$.

If the original content to be rendered is object based, it is possible to compute multiple renderings around the desired position and encode the level gradient. This level gradient G would typically consist of a 3D vector (one value for each of the three axes x, y, z). The receiver could then simply adjust the subband energy $E(P)$ in the received signal based on the difference between pre-rendered position P and current receiver position P' as $E(P')=E(P)\cdot(P'-P)\cdot\nabla E(P)$.

This extra information may be used by the receiver to further extrapolate the pre-rendered stream (i.e., the pre-rendered media content), for instance accounting for parallax effects (using the distance information) or adjusting the level of the rendering (using the level gradient information).

In one example, if the receiver is constrained in terms of computational power, the upmixing may be performed during encoding on the sender side. For example, B-format or channels may be converted into objects. This may increase encoding path latency, but the resulting content may be more flexible and may be extrapolated on the receiver side.

For gaming uses, where the user actions (e.g. button triggers) can affect the gameplay, the overall system latency would still need to be <20 msec, which may prevent running complex upmixing operations. As a result, a flexible format such as B-format may be the best candidate for rendering/transmission using a low latency lossless or lossy codec as it can also be rendered and rotated with low latency on the receive end.

Various audio codecs may incorporate the above described modes of data transmission. The codecs may be adapted for the following: (i) a possibility to transmit lossless coded (zero latency coded) stereo audio data or low latency lossy data; (ii) means to signal that content has been pre-rendered already, in the case that "usual" rendering (e.g. binauralization in the device) needs to be switched off (e.g. a bit stream syntax field. Both Dolby AC-4 and MPEG-H Part 3, 3D Audio, already include such a bitfield, such as the b_pre_virtualized in Dolby AC-4); and (iii) means to transmit the HRTFs and BRIRs if needed.

Thus, in the context of the present disclosure, the sender may also provide the receiver with an indication (e.g., flag, bit field, syntax field/element, parameter) that it provides pre-rendered audio content. If such indication is received by the receiver, the receiver may forego any (receiver-side) rendering of the audio content. For example, for binaural pre-rendered audio content, the receiver may directly route the pre-rendered audio content as received from the sender to (the speakers of) a headphone for reproduction, without any further rendering. Such indication may be in the form of a parameter directHeadphone that is signaled to the receiver in the bitstream. The directHeadphone parameter may define that the corresponding signal group of (type) channels goes to the headphone output, directly, if the binaural output is rendered. The signals may be routed to left and right headphone channel.

A possible example of the syntax for this parameter is reproduced in Table 4.

TABLE 4

| Syntax | No. of bits | Mnemonic |
|---|---|---|
| prodMetadataConfig( ) { /* high resolution object distance */ hasObjectDistance; /* direct to headphone */ | 1 | bslbf |

TABLE 4-continued

| Syntax | No. of bits | Mnemonic |
|---|---|---|
| for (gp = 0; gp < numChannelGroups; gp++ ) {    directHeadphone [gp];    } } | 1 | bslbf |

The semantics may be defined according to MPEG-H 3D Audio (ISO/IEC 23008-3) and/or future versions of the MPEG standard.

Further example embodiments of the disclosure are summarized in the Enumerated Example Embodiments (EEEs) listed below.

A first EEE relates to a method of processing media content for reproduction by a first apparatus, the method comprising: obtaining pose information indicative of a position and/or orientation of a user, transmitting the pose information to a second apparatus that provides the media content, rendering the media content based on the pose information to obtain rendered media content, and transmitting the rendered media content to the first apparatus for reproduction.

A second EEE relates to the method of the first EEE, wherein the media content comprises audio content and the rendered media content comprises rendered audio content; and/or the media content comprises video content and the rendered media content comprises rendered video content.

A third EEE relates to the method of the first EEE, wherein the media content comprises audio content and the rendered media content comprises rendered audio content, and the method further comprises generating an audible representation of the rendered audio content.

A fourth EEE relates to the method of the second EEE, wherein the audio content is one of First Order Ambisonics, FOA, -based, Higher Order Ambisonics, HOA, -based, object-based, or channel based audio content, or a combination of two or more of FOA-based, HOA-based, object-based, or channel based audio content.

A fifth EEE relates to the method of the second or third EEEs, wherein the rendered audio content is one of binaural audio content, FOA audio content, HOA audio content, or channel-based audio content, or a combination of two or more of binaural audio content, FOA audio content, HOA audio content, or channel-based audio content.

A sixth EEE relates to the method of any one of the first to fifth EEEs, wherein the rendering involves: obtaining predicted pose information based on the pose information and previous pose information, and rendering the media content based on the predicted pose information to obtain the rendered media content.

A seventh EEE relates to the method of the sixth EEE, further comprising:
transmitting the predicted pose information to the first apparatus together with the rendered media content.

An eighth EEE relates to the method of the seventh EEE, further comprising: comparing the predicted pose information to actual pose information, and updating the rendered media content based on a result of the comparison.

A ninth EEE relates to the method of the eight EEE, wherein the predicted pose information is predicted for an estimate of a timing at which the rendered media content is expected to be processed by the first apparatus for reproduction, and the actual pose information is pose information obtained at a timing at which the rendered media content is actually processed by the first apparatus for reproduction.

A tenth EEE relates to the method of any one of the first to ninth EEEs, wherein the rendered media content is transmitted to the first apparatus in uncompressed form.

An eleventh EEE relates to the method of any one of the first to tenth EEEs, further comprising:
encoding the rendered media content before transmission to the first apparatus; and decoding the encoded rendered media content after reception at the first apparatus.

A twelfth EEE relates to the method of the ninth EEE or any EEE including the features of the ninth EEE, wherein the estimate of the timing at which the rendered audio content is expected to be processed by the first apparatus for reproduction includes an estimation of a time that is necessary for encoding and decoding the rendered audio content and/or an estimate of a time that is necessary for transmitting the rendered media content to the first apparatus.

A 13th EEE relates to the method of the sixth EEE or any EEE including the features of the sixth EEE, wherein the predicted pose information is obtained further based on an estimate of a time that is necessary for encoding and decoding the rendered media content and/or an estimate of a time that is necessary for transmitting the rendered media content to the first apparatus.

A 14th relates to the method according to any one of the first to 13th EEEs, further comprising: comparing the pose information that has been used for rendering the media content to current pose information, and updating the rendered media content based on a result of the comparison.

A 15th EEE relates to the method of any one of the first to 14th EEEs, further comprising: determining, at the second apparatus, gradient information indicative of how the rendered media content changes in response to changes of the pose information, transmitting the gradient information to the first apparatus together with the rendered media content, comparing, at the first apparatus, the pose information that has been used for rendering the media content to current pose information, and updating the rendered media content based on the gradient information and a result of the comparison.

A 16th EEE relates to the method of any one of the first to 15th EEEs, wherein the media content comprises audio content and the rendered media content comprises rendered audio content, the method further comprises transmitting environmental information indicative of acoustic characteristics of an environment in which the first apparatus is located to the second apparatus, and the rendering the media content is further based on the environmental information.

A 17th EEE relates to the method of any one of the first to 16th EEEs, wherein the media content comprises audio content and the rendered media content comprises rendered audio content, the method further comprises transmitting morphologic information indicative of a morphology of the user or part of the user to the second apparatus, and the rendering the media content is further based on the morphologic information.

An 18th EEE relates to a system comprising a first apparatus for reproducing media content and a second apparatus storing the media content, wherein the first apparatus is adapted to: obtain pose information indicative of a position and/or orientation of a user, and transmit the pose information to the second apparatus, and the second apparatus is adapted to: render the media content based on the pose information to obtain rendered media content, and transmit the rendered media content to the first apparatus for reproduction.

A 19th EEE relates to the system of the 18th EEE, wherein the media content comprises audio content and the rendered media content comprises rendered audio content, and/or the media content comprises video content and the rendered media content comprises rendered video content.

A 20th EEE relates to the system of the 18th EEE, wherein the media content comprises audio content and the rendered media content comprises rendered audio content, and the first apparatus is further adapted to generate an audible representation of the rendered audio content.

A 21st EEE relates to the system of the 19th EEE, wherein the audio content is one of First Order Ambisonics, FOA, -based, Higher Order Ambisonics, HOA, -based, object-based, or channel based audio content, or a combination of two or more of FOA-based, HOA-based, object-based, or channel based audio content.

A 22nd EEE relates to the system of any one of the 19th to 21st EEEs, wherein the rendered audio content is one of binaural audio content, FOA audio content, HOA audio content, or channel-based audio content, or a combination of two or more of binaural audio content, FOA audio content, HOA audio content, or channel-based audio content.

A 23rd EEE relates to the system of any one of the 18th to 22nd EEEs, wherein the second apparatus is further adapted to: obtain predicted pose information based on the pose information and previous pose information, and render the media content based on the predicted pose information to obtain the rendered media content.

A 24th EEE relates to the system of the 23rd EEE, wherein the second apparatus is further adapted to: transmit the predicted pose information to the first apparatus together with the rendered media content.

A 25th EEE relates to the system of the 24th EEE, wherein the first apparatus is further adapted to: compare the predicted pose information to actual pose information, and update the rendered media content based on a result of the comparison.

A 26th EEE relates to the system of the 25th EEE, wherein the predicted pose information is predicted for an estimate of a timing at which the rendered media content is expected to be processed by the first apparatus for reproduction, and the actual pose information is pose information obtained at a timing at which the rendered media content is actually processed by the first apparatus for reproduction.

A 27th EEE relates to the system of any one of the 18th to 26th EEEs, wherein the rendered media content is transmitted to the first apparatus in uncompressed form.

A 28th EEE relates to the system of any one of the 18th to 27th EEEs, wherein the second apparatus is further adapted to encode the rendered media content before transmission to the first apparatus, and the first apparatus is further adapted to decode the encoded rendered media content after reception at the first apparatus.

A 29th EEE relates to the system of the 26th EEE or any EEE including the features of the 26th EEE, wherein the estimate of the timing at which the rendered audio content is expected to be processed by the first apparatus for reproduction includes an estimation of a time that is necessary for encoding and decoding the rendered audio content and/or an estimate of a time that is necessary for transmitting the rendered media content to the first apparatus.

A 30th EEE relates to the system of the 23rd EEE or any EEE including the features of the 23rd EEE, wherein the predicted pose information is obtained further based on an estimate of a time that is necessary for encoding and decoding the rendered media content and/or an estimate of a time that is necessary for transmitting the rendered media content to the first apparatus.

A 31st EEE relates to the system of any one of the 18th to 30th EEEs, wherein the first apparatus is further adapted to: compare the pose information that has been used for rendering the media content to current pose information, and update the rendered media content based on a result of the comparison.

A 32nd EEE relates to the system of any one of the 18th to 31st EEEs, wherein the second apparatus is further adapted to: determine gradient information indicative of how the rendered media content changes in response to changes of the pose information, and transmit the gradient information to the first apparatus together with the rendered media content, and the first apparatus is further adapted to: compare the pose information that has been used for rendering the media content to current pose information, and update the rendered media content based on the gradient information and a result of the comparison.

A 33rd EEE relates to the system of any one of the 18th to 32nd EEEs, wherein the media content comprises audio content and the rendered media content comprises rendered audio content, the first apparatus is further adapted to transmit environmental information indicative of acoustic characteristics of an environment in which the first apparatus is located to the second apparatus, and the rendering the media content is further based on the environmental information.

A 34th EEE relates to the system of any one of the 18th to 33rd EEEs, wherein the media content comprises audio content and the rendered media content comprises rendered audio content, the first apparatus is further adapted to transmit morphologic information indicative of a morphology of the user or part of the user to the second apparatus, and the rendering the media content is further based on the morphologic information.

A 35th EEE relates to a second apparatus for providing media content for reproduction by a first apparatus, the second apparatus adapted to: receive pose information indicative of a position and/or orientation of a user of the first apparatus, render the media content based on the pose information to obtain rendered media content, and transmit the rendered media content to the first apparatus for reproduction.

A 36th EEE relates to the second apparatus of the 35th EEE, wherein the media content comprises audio content and the rendered media content comprises rendered audio content, and/or the media content comprises video content and the rendered media content comprises rendered video content.

A 37th EEE relates to the second apparatus of the 36th EEE, wherein the audio content is one of First Order Ambisonics, FOA, -based, Higher Order Ambisonics, HOA, -based, object-based, or channel based audio content, or a combination of two or more of FOA-based, HOA-based, object-based, or channel based audio content.

A 38th EEE relates to the second apparatus of the 36th EEE, wherein the rendered audio content is one of binaural audio content, FOA audio content, HOA audio content, or channel-based audio content, or a combination of two or more of binaural audio content, FOA audio content, HOA audio content, or channel-based audio content.

A 39th EEE relates to the second apparatus of any one of the 35th to 38th EEEs, further adapted to: obtain predicted pose information based on the pose information and previous pose information, and render the media content based on the predicted pose information to obtain the rendered media content.

A 40th EEE relates to the second apparatus of the 39th EEE, further adapted to: transmit the predicted pose information to the first apparatus together with the rendered media content.

A 41st EEE relates to the second apparatus of the 39th or 40th EEEs, wherein the predicted pose information is predicted for an estimate of a timing at which the rendered media content is expected to be processed by the first apparatus for reproduction.

A 42nd EEE relates to the second apparatus of any one of the 35th to 41st EEEs, wherein the rendered media content is transmitted to the first apparatus in uncompressed form.

A 43rd EEE relates to the second apparatus of any one of the 35th to 42nd EEEs, further adapted to encode the rendered media content before transmission to the first apparatus.

A 44th EEE relates to the second apparatus of the 41st EEE or any EEE including the features of the 41st EEE, wherein the estimate of the timing at which the rendered audio content is expected to be processed by the first apparatus for reproduction includes an estimation of a time that is necessary for encoding and decoding the rendered audio content and/or an estimate of a time that is necessary for transmitting the rendered media content to the first apparatus.

A 45th EEE relates to the second apparatus of the 39th EEE or any EEE including the features of the 39th EEE, wherein the predicted pose information is obtained further based on an estimate of a time that is necessary for encoding and decoding the rendered media content and/or an estimate of a time that is necessary for transmitting the rendered media content to the first apparatus.

A 46th EEE relates to the second apparatus of any one of the 35th to 45th EEEs, further adapted to: determine gradient information indicative of how the rendered media content changes in response to changes of the pose information, and transmit the gradient information to the first apparatus together with the rendered media content.

A 47th EEE relates to the second apparatus of any one of the 35th to 46th EEEs, wherein the media content comprises audio content and the rendered media content comprises rendered audio content, the second apparatus is further adapted to receive environmental information indicative of acoustic characteristics of an environment in which the first apparatus is located from the first apparatus, and the rendering the media content is further based on the environmental information.

A 48th EEE relates to the second apparatus of any one of the 35th to 47th EEEs, wherein the media content comprises audio content and the rendered media content comprises rendered audio content, the second apparatus is further adapted to receive morphologic information indicative of a morphology of the user or part of the user from the first apparatus, and the rendering the media content is further based on the morphologic information.

A 49th EEE relates to a first apparatus for reproducing media content provided by a second apparatus, the first apparatus adapted to: obtain pose information indicative of a position and/or orientation of a user of the first apparatus, transmit the pose information to the second apparatus, receive rendered media content from the second apparatus, wherein the rendered media content has been obtained by rendering the media content based on the pose information, and reproduce the rendered media content.

A 50th EEE relates to the first apparatus of the 49th EEE, wherein the media content comprises audio content and the rendered media content comprises rendered audio content, and/or the media content comprises video content and the rendered media content comprises rendered video content.

A 51st EEE relates to the first apparatus of the 49th EEE, wherein the media content comprises audio content and the rendered media content comprises rendered audio content, and the first apparatus is further adapted to generate an audible representation of the rendered audio content.

A 52nd EEE relates to the first apparatus of the 50th or 51st EEE, wherein the audio content is one of First Order Ambisonics, FOA, -based, Higher Order Ambisonics, HOA, -based, object-based, or channel based audio content, or a combination of two or more of FOA-based, HOA-based, object-based, or channel based audio content.

A 53rd EEE relates to the first apparatus of any one of the 50th to 52nd EEEs, wherein the rendered audio content is one of binaural audio content, FOA audio content, HOA audio content, or channel-based audio content, or a combination of two or more of binaural audio content, FOA audio content, HOA audio content, or channel-based audio content.

A 54th EEE relates to the first apparatus of any one of the 49th to 53rd EEEs, further adapted to: receive pose information that has been used for rendering the media content together with the rendered media content from the second apparatus, compare the pose information that has been used for rendering the media to actual pose information, and update the rendered media content based on a result of the comparison.

A 55th EEE relates to the first apparatus of the 54th EEE, wherein the actual pose information is pose information obtained at a timing at which the rendered media content is processed by the first apparatus for reproduction.

A 56th EEE relates to the first apparatus of any one of the 49th to 55th EEEs, further adapted to obtain predicted pose information based on the pose information and previous pose information, and transmit the predicted pose information to the second apparatus.

A 57th EEE relates to the first apparatus of the 56th EEE, wherein the predicted pose information is predicted for an estimate of a timing at which the rendered media content is expected to be processed by the first apparatus for reproduction.

A 58th EEE relates to the first apparatus of any one of the 49th to 57th EEEs, wherein the rendered media content is received from the second apparatus in uncompressed form.

A 59th EEE relates to the first apparatus of any one of the 49th to 58th EEEs, wherein the first apparatus is further adapted to decode encoded rendered media content.

A 60th EEE relates to the first apparatus of the 57th EEE or any EEE including the features of the 57th EEE, wherein the estimate of the timing at which the rendered audio content is expected to be processed by the first apparatus for reproduction includes an estimation of a time that is necessary for encoding and decoding the rendered audio content and/or an estimate of a time that is necessary for transmitting the rendered media content to the first apparatus.

A 61st EEE relates to the first apparatus of any one of the 49th to 60th EEEs, further adapted to: compare the pose information that has been used for rendering the media content to current pose information, and update the rendered media content based on a result of the comparison.

A 62nd EEE relates to the first apparatus of any one of the 49th to 61st EEEs, further adapted to: receive gradient information indicative of how the rendered media content changes in response to changes of the pose information together with the rendered media content from the second apparatus, compare the pose information that has been used for rendering the media content to current pose information, and update the rendered media content based on the gradient information and a result of the comparison.

A 63rd EEE relates to the first apparatus of any one of the 49th to 62nd EEEs, wherein the media content comprises audio content and the rendered media content comprises rendered audio content, the first apparatus is further adapted to transmit environmental information indicative of acoustic characteristics of an environment in which the first apparatus is located to the second apparatus, and the rendering the media content is further based on the environmental information.

A 64th EEE relates to the first apparatus of any one of the 49th to 63rd EEEs, wherein the media content comprises audio content and the rendered media content comprises rendered audio content, the first apparatus is further adapted to transmit morphologic information indicative of a morphology of the user or part of the user to the second apparatus, and the rendering the media content is further based on the morphologic information.

A 65th EEE relates to a method for rendering audio content. The method comprises: receiving, by a sender (S) apparatus, user-position and/or orientation data and sending corresponding pre-rendered content, typically derived from an object-5 based or HOA representation.

A 66th EEE relates to the method of the 65th EEE, wherein the pre-rendered signal generated by the sender can be binaural, FOA/B-format, HOA or any type of channel-based rendering.

A 67th EEE relates to the method of the 65th or 66th EEEs, further comprising transmitting uncompressed pre-rendered content.

A 68th EEE relates to the method of the 65th or 66th EEEs, further comprising encoding the pre-rendered content and transmitting the encoded pre-rendered content.

A 69th EEE relates to the method of any one of the 65th to 68th EEEs, further comprising receiving the pre-rendered content by a receiver.

A 70th EEE relates to the method of any one of the 65th to 69th EEEs, further comprising decoding the pre-rendered, pre-encoded binauralized content by a receiver.

A 71st EEE relates to the method of any one of the 65th to 70th EEEs, wherein the user-position and/or orientation data comprises of a local pose that indicates the user's position and orientation in world space.

An 72nd EEE relates to the method of any one of the 65th to 71st EEEs, wherein the user-position data is transmitted to the sender from a receiver.

A 73rd EEE relates to the method of any one of the 65th to 72nd EEEs, further comprising transmitting the user-position data used for the pre-rendered binauralized content back to the receiver.

A 74th EEE relates to the method of any one of the 65th to 73rd EEEs, further comprising extrapolating the pre-rendered content based on the received user-position data and the local position data to determine updated content.

A 75th EEE relates to the method of any one of the 65th to 74th EEEs, further comprising transmitting morphological data about the user (e.g., head size, head shape) for individualized binaural processing.

A 76th EEE relates to the method of any one of the 65th to 75th EEEs, further comprising transmitting data about BRIR functions and/or room characterization.

A 77th EEE relates to the method of any one of the 65th to 76th EEEs, further comprising, based on a determination that the content is transmitted in a listener-agnostic way (e.g. does not included HRTFs), then binaural rendering and individualization is performed at the receiver side.

A 78th EEE relates to the method of any one of the 65th to 77th EEEs, further comprising providing the user position and/or orientation data P(t0) at a point in time t1.

A 79th EEE relates to the method of the 67th EEE, wherein the uncompressed pre-rendered content is binauralized uncompressed pre-rendered content.

The invention claimed is:

1. A method of processing audio content, the method comprising:
    obtaining, using one or more processors, first pose information indicative of a first position or orientation of a user;
    obtaining, using the one or more processors, predicted pose information based on the first pose information and previous pose information;
    rendering, using the one or more processors, the audio content based on the predicted pose information to obtain rendered audio content; and
    transmitting, using the one or more processors, the rendered audio content and predicted pose information to a first apparatus for reproduction, wherein the predicted pose information and second pose information are used to update the rendered audio content prior to reproducing the updated rendered audio content at the first apparatus.

2. The method according to claim 1, wherein the audio content is one of First Order Ambisonics, FOA-based, Higher Order Ambisonics, HOA-based, object-based, or channel based audio content, or a combination of two or more of FOA-based, HOA-based, object-based, or channel based audio content.

3. The method according to claim 1, wherein the rendered audio content is one of binaural audio content, FOA audio content, HOA audio content, or channel-based audio content, or a combination of two or more of binaural audio content, FOA audio content, HOA audio content, or channel-based audio content.

4. The method according to claim 1, wherein using the predicted pose information and the second pose information to update the rendered audio content further comprises
    comparing the predicted pose information to the second pose information; and
    updating the rendered audio content based on a result of the comparison.

5. The method according to claim 4, wherein the predicted pose information is predicted for an estimate of a timing at which the rendered audio content is expected to be processed by the first apparatus for reproduction; and
    the second pose information is pose information obtained at a timing at which the rendered audio content is actually processed by the first apparatus for reproduction.

6. The method according to claim 1, wherein the rendered audio content is transmitted to the first apparatus in uncompressed form.

7. The method according to claim 1, further comprising:
    encoding the rendered audio content before transmission to the first apparatus; and decoding the encoded rendered audio content after reception at the first apparatus.

8. The method according to claim 5, wherein the estimate of the timing at which the rendered audio content is expected to be processed by the first apparatus for reproduction includes an estimation of a time that is necessary for encoding and decoding the rendered audio content and/or an estimate of a time that is necessary for transmitting the rendered audio content to the first apparatus.

9. The method according to claim 1, wherein the predicted pose information is obtained further based on an estimate of a time that is necessary for encoding and decoding the rendered audio content and/or an estimate of a time that is necessary for transmitting the rendered audio content to the first apparatus.

10. The method according to claim 1, further comprising:
comparing the predicted pose information that has been used for rendering the audio content to the second pose information; and
updating the rendered audio content based on a result of the comparison.

11. The method according to claim 1, further comprising:
determining, at the second apparatus, gradient information indicative of how the rendered audio content changes in response to changes of the pose information;
transmitting the gradient information to the first apparatus together with the rendered audio content;
comparing, at the first apparatus, the pose information that has been used for rendering the audio content to current pose information; and
updating the rendered audio content based on the gradient information and a result of the comparison.

12. The method according to claim 1, wherein
the method further comprises transmitting environmental information indicative of acoustic characteristics of an environment in which the first apparatus is located to the second apparatus; and
the rendering the audio content is further based on the environmental information.

13. The method according to claim 1, wherein
the method further comprises transmitting morphologic information indicative of a morphology of the user or part of the user to the second apparatus; and
the rendering the audio content is further based on the morphologic information.

14. A system comprising:
one or more processors;
memory storing instructions, that when executed by one or more processors, cause the one or more processors to perform operations comprising:
obtaining first pose information indicative of a first position or orientation of a user;
obtaining predicted pose information based on the first pose information and previous pose information;
rendering the audio content based on the predicted pose information to obtain rendered audio content; and
transmitting the rendered audio content and the predicted pose information to the first apparatus for reproduction, wherein the predicted pose information and second pose information are used to update the rendered audio content prior to reproducing the updated rendered audio content at the first apparatus.

15. The system according to claim 14, wherein the rendered audio content is one of binaural audio content, FOA audio content, HOA audio content, or channel-based audio content, or a combination of two or more of binaural audio content, FOA audio content, HOA audio content, or channel-based audio content.

16. A method of processing media content for reproduction by a first apparatus, the method comprising:
obtaining, using one or more processors, pose information indicative of a position or orientation of a user;
obtaining, using the one or more processors, predicted pose information based on the pose information and previous pose information;
rendering, using the one or more processors, the media content based on the predicted pose information to obtain rendered media content;
obtaining, using the one or more processors, gradient information indicative of how the rendered media content changes in response to changes of the pose information; and
transmitting, using the one or more processors, the rendered media content and gradient information to the first apparatus for use in updating and reproducing the updated rendered media content by the first apparatus.

17. The method of claim 16, further comprising:
transmitting, using the one or more processors, the predicted pose to the first apparatus for use in updating and reproducing the updated rendered media content by the first apparatus.

18. A method comprising:
obtaining, using one or more processors of a first apparatus, first pose information indicative of a first position or orientation of a user;
transmitting, using the one or more processors, the first pose information to a second apparatus;
receiving, using the one or more processors, rendered audio content from the second apparatus, where the rendered audio content was rendered by the second apparatus using predicted pose information, the predicted pose information based on the first pose information;
obtaining, using the one or more processors, second pose information indicative of a second position or orientation of the user;
updating, using the one or more processors, the rendered audio content based on the second pose information; and
reproducing, using the one or more processors, the updated rendered audio content.

19. The method of claim 18, further comprising:
receiving, using the one or more processors, the predicted pose from the second apparatus; and
updating, using the one or more processors, the rendered audio content based on a difference between the predicted pose and the second pose information.

20. A system comprising a first apparatus for reproducing rendered audio content and a second apparatus for producing the rendered audio content,
the first apparatus configured to:
obtain first pose information indicative of a first position or orientation of a user;
transmit the first pose information to the second apparatus;
receive rendered audio content from the second apparatus;
obtain second pose information indicative of a second position or orientation of the user;
update the rendered audio content using at least the second pose information; and
reproduce the updated rendered audio content.

21. The system of claim 20, wherein the first apparatus is further configured to receive the predicted pose from the first apparatus and to update the rendered audio content based on a difference between the predicted pose and the second pose information.

\* \* \* \* \*